United States Patent
Kealy et al.

(10) Patent No.: US 8,567,354 B2
(45) Date of Patent: Oct. 29, 2013

(54) PORTABLE ENERGY GENERATION SYSTEMS

(75) Inventors: Joseph P. Kealy, Phoenix, AZ (US); Janet R. Kealy, legal representative, Phoenix, AZ (US); Anthony J. Carmen, Bloomfield Hills, MI (US); Douglas R. Heise, Tempe, AZ (US)

(73) Assignee: Clear Energy Systems, Inc., Tempe, AZ (US)

( * ) Notice: Subject to any disclaimer, the term of this patent is extended or adjusted under 35 U.S.C. 154(b) by 854 days.

(21) Appl. No.: 12/503,066

(22) Filed: Jul. 14, 2009

(65) Prior Publication Data
US 2010/0072757 A1 Mar. 25, 2010

Related U.S. Application Data

(60) Provisional application No. 61/122,663, filed on Dec. 15, 2008, provisional application No. 61/081,648, filed on Jul. 17, 2008.

(51) Int. Cl.
*F02B 63/00* (2006.01)
*F02B 63/04* (2006.01)

(52) U.S. Cl.
USPC .............................. 123/2; 290/1 A; 290/1 B

(58) Field of Classification Search
USPC ............................. 123/2, 3; 290/1 R, 1 A, 1 B
See application file for complete search history.

(56) References Cited

U.S. PATENT DOCUMENTS

| 1,751,958 | A | * | 3/1930 | Treiber ........................ 290/1 A |
| 2,183,031 | A | * | 12/1939 | Rippingille ................ 123/41.35 |
| 2,252,051 | A | * | 8/1941 | Towle ............................. 184/6.6 |
| 2,352,497 | A | * | 6/1944 | Rosen et al. ............... 123/41.35 |
| 2,383,996 | A | | 9/1945 | Stucke |
| 2,543,541 | A | * | 2/1951 | Angle ........................... 290/1 B |
| 2,715,685 | A | | 8/1955 | Brown |
| 3,418,485 | A | | 12/1968 | Anderson et al. |
| 3,791,682 | A | | 2/1974 | Mitchell |
| 3,868,250 | A | * | 2/1975 | Zimmermann ............... 420/535 |
| 4,117,342 | A | * | 9/1978 | Melley, Jr. ..................... 290/1 A |
| 4,136,432 | A | | 1/1979 | Melley, Jr. |
| 5,081,832 | A | | 1/1992 | Mowill |
| 5,564,187 | A | * | 10/1996 | Sihon ......................... 29/888.41 |
| 5,626,105 | A | | 5/1997 | Locke et al. |
| 5,724,242 | A | | 3/1998 | Moore-McKee et al. |
| 6,446,425 | B1 | | 9/2002 | Lawlor |
| 6,717,282 | B1 | | 4/2004 | Maxwell |
| 6,962,057 | B2 | | 11/2005 | Kurokawa et al. |
| 7,308,869 | B2 | | 12/2007 | Stone |
| 7,360,510 | B2 | * | 4/2008 | Bontaz et al. .............. 123/41.35 |
| 8,037,966 | B2 | * | 10/2011 | Errera et al. .................. 181/243 |
| 2005/0145213 | A1 | | 7/2005 | Schapiro |

FOREIGN PATENT DOCUMENTS

| EP | 1146213 A2 | 10/2001 |
| GB | 2116585 A * | 9/1983 |
| WO | WO02097251 A1 | 12/2002 |

* cited by examiner

*Primary Examiner* — Noah Kamen
(74) *Attorney, Agent, or Firm* — Bejin, VanOphem & Bieneman PLC

(57) ABSTRACT

Portable energy generation systems are disclosed. More particularly, a high-output mobile electrical generator system comprising a radial engine power source providing a highly compact physical format.

31 Claims, 29 Drawing Sheets

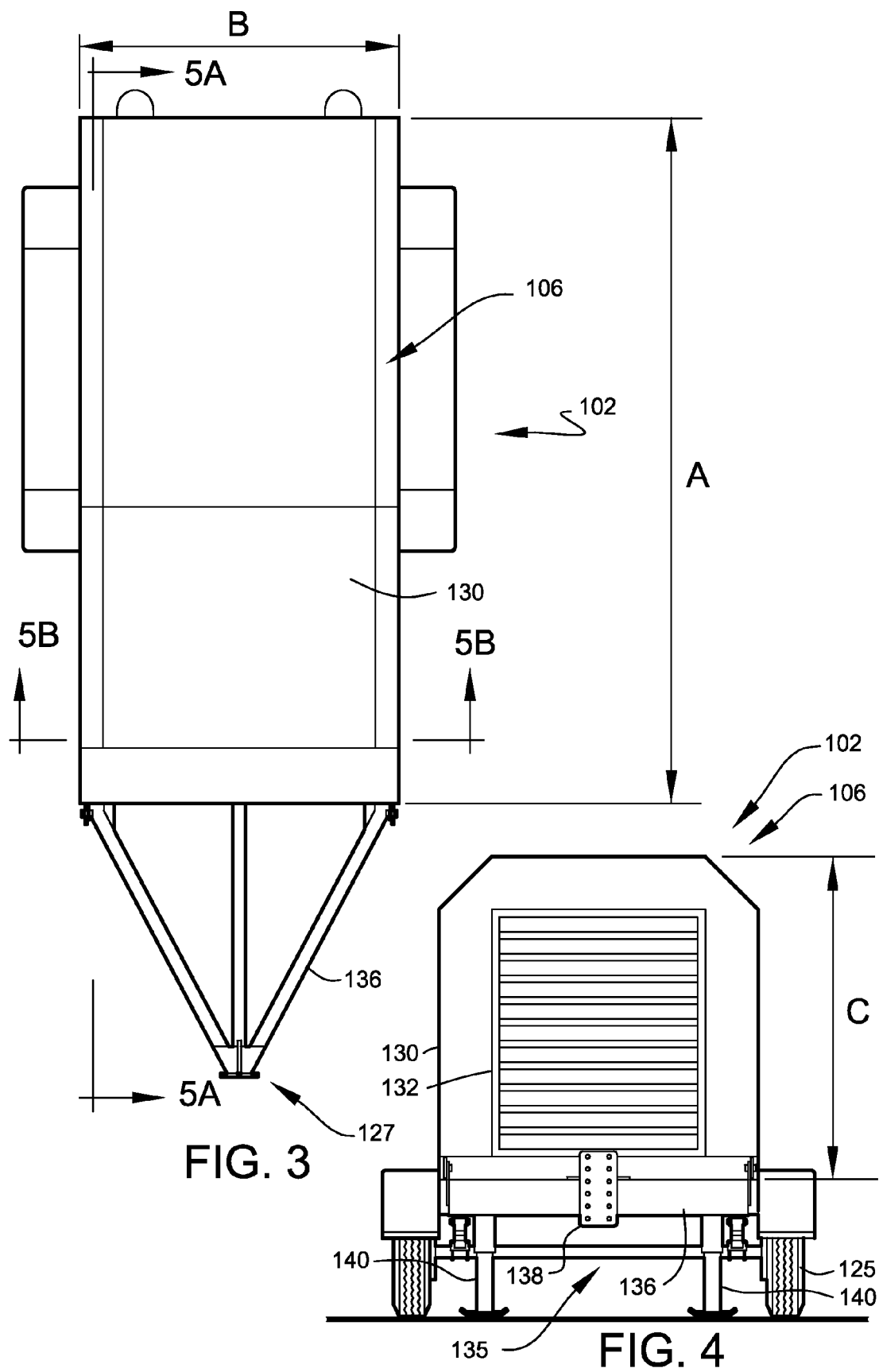

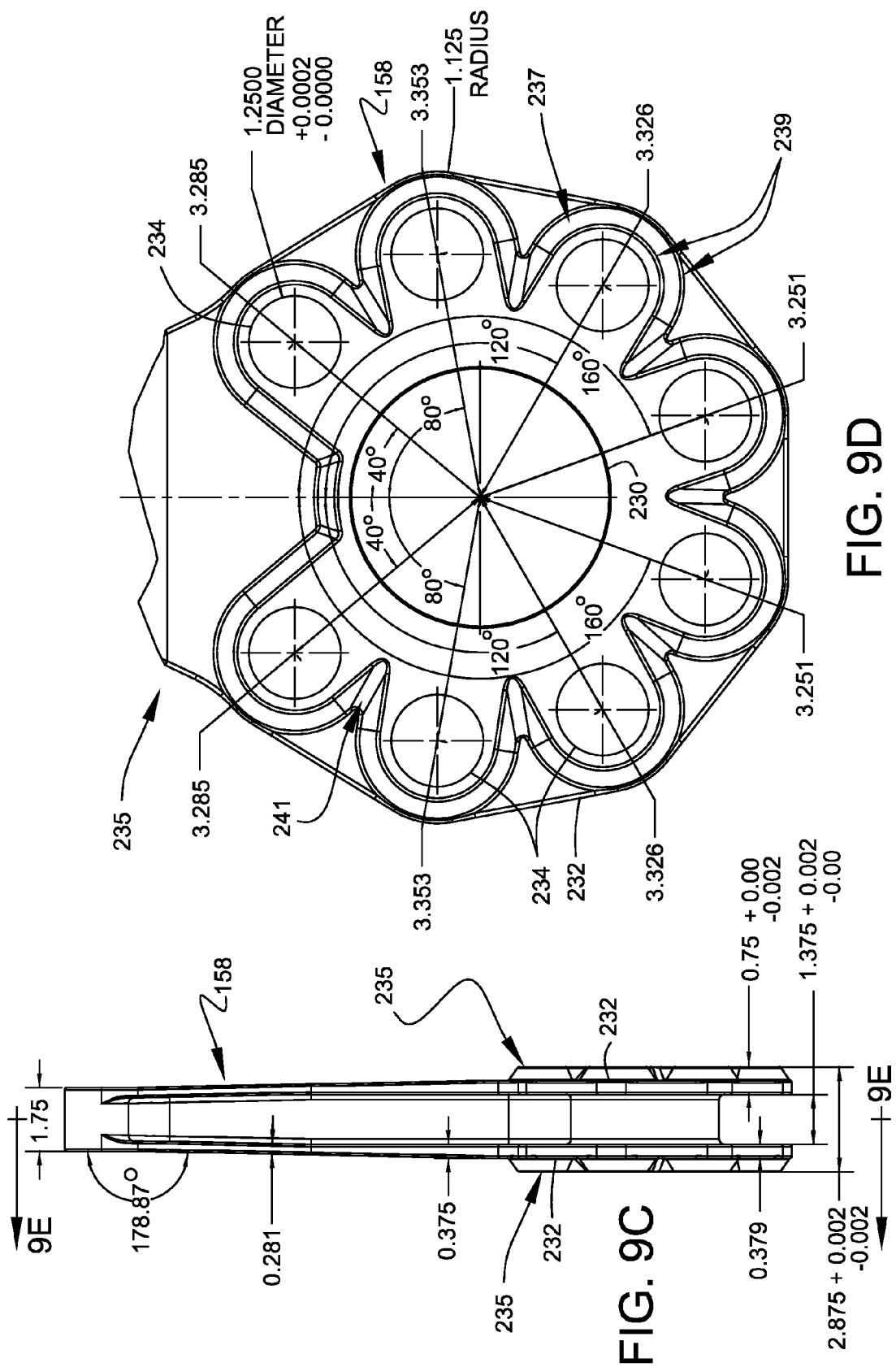

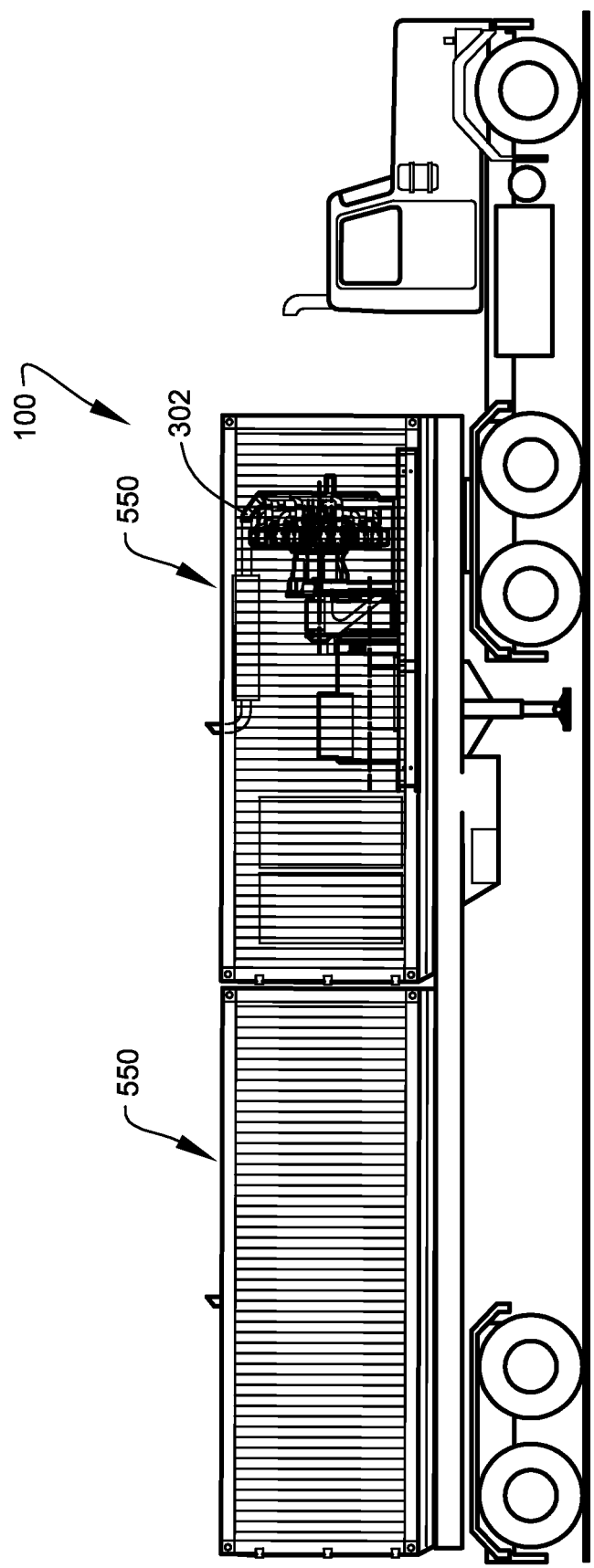

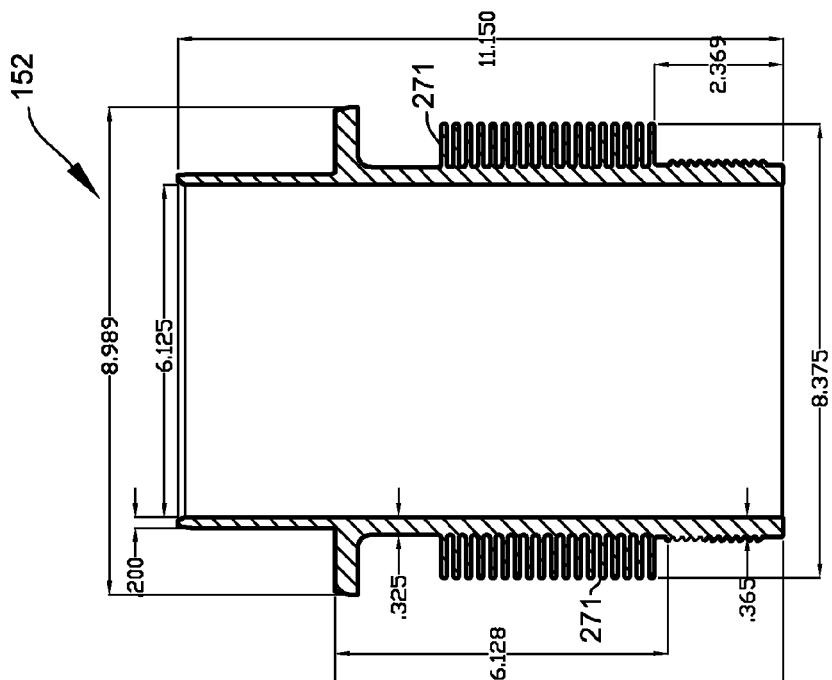
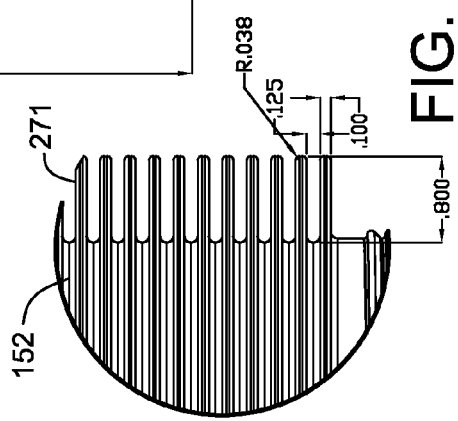
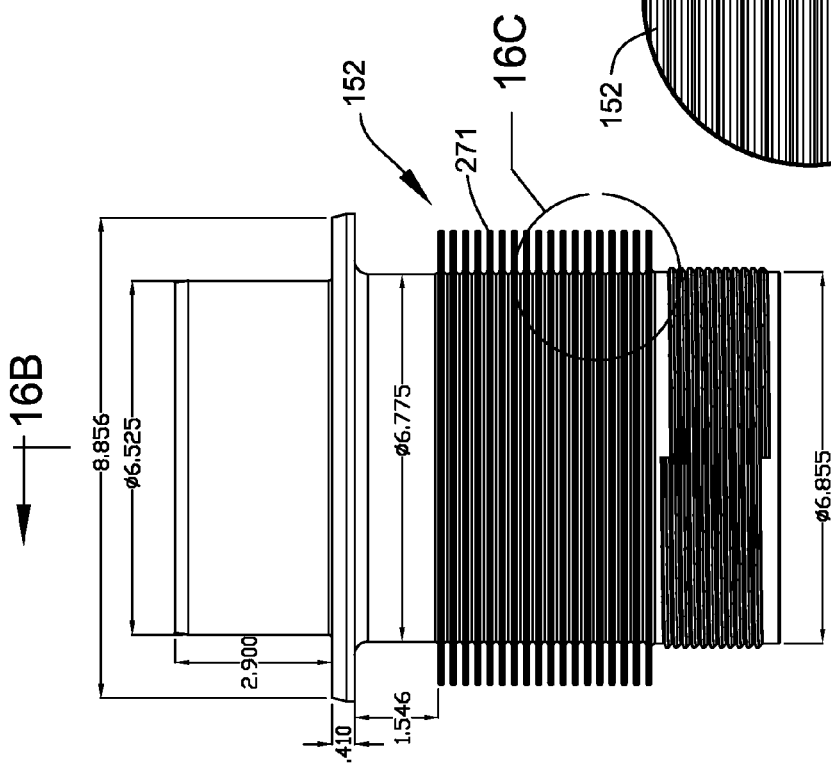
FIG. 16B
FIG. 16C
FIG. 16A

US 8,567,354 B2

PORTABLE ENERGY GENERATION SYSTEMS

CROSS-REFERENCE TO RELATED APPLICATION

The present application is related to and claims priority from prior provisional application Ser. No. 61/081,648, filed Jul. 17, 2008, entitled "PORTABLE ENERGY GENERATION SYSTEMS", and is related to and claims priority from prior provisional application Ser. No. 61/122,663, filed Dec. 15, 2008, entitled "PORTABLE ENERGY GENERATION SYSTEMS", the content of both of which are incorporated herein by this reference and are not admitted to be prior art with respect to the present invention by the mention in this cross-reference section.

BACKGROUND

This invention relates to providing a system for improved portable energy generation systems. More particularly, this invention relates to electrical generation systems comprising high-output electrical generators of very compact physical size and low physical weight.

Mobile generator sets are often used to provide emergency, standby, peak shaving, and continuous electrical power to a wide range of electrically-dependent operations. Typical diesel or natural gas-powered mobile generator sets are large, heavy, and expensive to transport. For example, a mobile generator set having an electrical output in the range of 1000 kW (kilowatts) typically comprises a weight of between about 50,000 to 80,000 pounds, typically requiring a tractor-trailer rig for transport. Furthermore, such traditional generation systems often require a high level of site coordination to address issues related to the physical size and structural loading imposed by the location of such units in and around a building structure, often resulting in limited placement options. The operation and maintenance of such traditional generator sets tends to be high, as any maintenance of the power components requires difficult on-site work or the labor-intensive removal and hauling of a generation unit or unit components to a remote service facility.

Clearly, the development of smaller electrical generation systems that can deliver equivalent amounts of affordable, environmentally friendly electrical energy would be of great benefit to many.

OBJECTS AND FEATURES OF THE INVENTION

A primary object and feature of the present invention is to provide a system overcoming the above-mentioned problems.

It is a further object and feature of the present invention to provide such a system comprising a high-efficiency electrical generator set having a physical size and weight significantly lower than that of current conventional systems. It is another object and feature of the present invention to provide such a system that is capable of producing about 1 megawatt of electrical power.

It is another object and feature of the present invention to provide such a system that comprises a durable continuous-service power source exhibiting a high power-to-weight ratio. It is another object and feature of the present invention to provide such a system comprising a power source capable of utilizing multiple fuels. It is a further object and feature of the present invention to provide such a system that is quickly and easily moved, serviced, and installed.

It is another object and feature of the present invention to provide such a system that comprises at least one preferred method of monetizing the altering of an existing engine design used for aircraft for land-based power generation.

In addition, it is another object and feature of the present invention to provide such a system that comprises at least one preferred method of "industrializing" a prior engine design so that the engine is useable for an alternate purpose.

A further primary object and feature of the present invention is to provide such a system that is efficient, inexpensive, and useful. Other objects and features of this invention will become apparent with reference to the following descriptions.

SUMMARY OF THE INVENTION

In accordance with a preferred embodiment hereof, this invention provides a portable system relating to the generation of electric power comprising: at least one portable electric generator structured and arranged to generate such electrical power; wherein such at least one portable electric generator comprises at least one internal combustion engine structured and arranged to produce at least one output of rotary power, operationally coupled with such at least one internal combustion engine, at least one electrical generator structured and arranged to convert such at least one output of rotary power to at least one output of electrical energy, at least one electrical controller structured and arranged to control such at least one output of electrical energy, at least one wheeled chassis structured and arranged to assist wheeled transport of such at least one internal combustion engine, such at least one electrical generator, and such at least one electrical controller, an outer housing, having an enclosed volume, structured and arranged to house such at least one internal combustion engine, such at least one electrical generator, and such at least one electrical controller, and at least one mount structured and arranged to mount such outer housing to such at least one wheeled chassis; wherein such at least one internal combustion engine comprises a plurality of combustion chambers organized in at least one radial geometry; and wherein each combustion chamber of such plurality of combustion chambers comprises at least one piston reciprocably disposed within at least one cylinder.

Moreover, it provides such a portable system wherein such at least one portable electric generator comprises: a system weight excluding operating fuel; and a peak electrical output to system weight ratio of about 0.17 kilowatts per kilogram. Additionally, it provides such a portable system wherein such at least one portable electric generator comprises a peak electrical output of about one megawatt. Also, it provides such a system wherein such at least one portable electric generator comprises a maximum system weight of less than about 7800 kilograms.

In addition, it provides such a portable system wherein such at least one portable electric generator comprises a peak electrical output to enclosed housing volume ratio of about 41.5 kilowatts per cubic meter. And, it provides such a portable system wherein such outer housing comprises an enclosed volume of less than about 24 cubic meters. Further, it provides such a portable system wherein such outer housing comprises a maximum outer dimension of less than about 4 meters. Even further, it provides such a portable system wherein such plurality of combustion chambers comprises at least nine pistons reciprocably disposed within at least nine cylinders.

Moreover, it provides such a portable system wherein each combustion chamber of such plurality of combustion chambers comprises a cylinder bore diameter of about 6.125 inches. Additionally, it provides such a portable system wherein such at least one internal combustion engine comprises a piston stroke of about 6.875 inches.

Also, it provides such a portable system wherein such at least one internal combustion engine further comprises: at least one induction pathway structured and arranged to introduce a combustible air fuel mixture into such plurality of combustion chambers of such at least one internal combustion engine; wherein such at least one induction pathway comprises at least one air fuel mixer structured and arranged to produce such at least one combustible air fuel mixture, and at least one compressor structured and arrange to pressurize such at least one combustible air fuel mixture prior to introduction into such plurality of combustion chambers. In addition, it provides such a portable system wherein such at least one compressor comprises at least one exhaust-driven turbocharger structured and arrange to be driven by exhaust gas exiting such at least one internal combustion engine.

In accordance with another preferred embodiment hereof, this invention provides a system relating to the generation of electric power comprising: at least one portable electric generator structured and arranged to generate such electrical power; wherein such at least one portable electric generator comprises at least one prime mover structured and arranged to output rotary power, at least one electrical generator structured and arranged to convert at least one input of rotary power to at least one output of electrical energy, and at least one rotary-power coupler structured and arranged to operably couple such at least one output of rotary power with such at least one input of rotary power, at least one electrical controller structured and arranged to control such at least one output of electrical energy, and at least one support frame structured and arranged to support such at least one prime mover, such at least one electrical generator, such at least one electrical controller, and such at least one rotary-power coupler; wherein such at least one output of rotary power is directed along at least one output shaft of such at least one prime mover; wherein such at least one input of rotary power is received along at least one input shaft of such at least one electrical generator; wherein such at least one output shaft and such at least one input shaft do not share a common rotational axis; and wherein such at least one rotary-power coupler comprises at least one drive belt structured and arranged to rotationally couple such at least one output shaft and such at least one input shaft.

It further provides such a system wherein such at least one rotary-power coupler is further structured and arranged to vary the relative rotational speeds of such at least one output shaft and such at least one input shaft.

In accordance with another preferred embodiment hereof, this invention provides a system relating to the generation of electric power comprising: at least one portable electric generator structured and arranged to generate such electrical power; wherein such at least one portable electric generator comprises at least one internal combustion engine structured and arranged to produce at least one output of rotary power, operationally coupled with such at least one internal combustion engine, at least one electrical generator structured and arranged to convert such at least one output of rotary power to at least one output of electrical energy, and at least one electrical controller structured and arranged to control such at least one output of electrical energy, and an outer housing structured and arranged to house such at least one internal combustion engine, such at least one electrical generator, and such at least one electrical controller; wherein such at least one portable electric generator comprises a peak electrical output of about 1 megawatt; and wherein such outer housing comprises an enclosed volume of less than about 24 cubic meters. Further, it provides such a system wherein such outer housing comprises a maximum outer dimension of less than about four meters. Even further, it provides such a system wherein such at least one portable electric generator comprises a weight less than about 5000 kilograms.

In accordance with another preferred embodiment hereof, this invention provides a method of increasing the time between overhauls within at least one aviation-derived engine during use in non-aviation service, such method comprising the steps of: identifying within such at least one aviation-derived engine, at least one first set of engine components to be modified to extend the time between overhauls of such at least one aviation-derived engine during such non-aviation service; providing at least one second set of industrialized engine components to replace substantially such engine components within such at least one set; and replacing such engine components of such at least one set with such at least one industrialized engine component; wherein such at least one first set comprises at least about fifty percent of the overall engine components comprising such at least one aviation-derived engine; and wherein such replacement of engine components extends the time between overhauls of such at least one aviation-derived engine during such non-industrial service.

In accordance with another preferred embodiment hereof, this invention provides a method related to providing standard modular power units capable of producing electrical power comprising the steps of: determining an approximate size and power output for at least one modular generator engine unit to service at least one large-power consumer: determining a first set of component arrangements comprising efficient concatenations of at least one prime-mover, at least one electrical generator, and at least one control component of such at least one generator engine unit; determining a second set of minimum spaces into which such power components, electrical-generation components, and control components are together packageable; selecting from within such set at least one minimum space to become such standard modular power unit; providing such standard modular power unit comprising such power components, such electrical-generation components, and such control components packaged within the selected such at least one minimum space.

Even further, it provides such a method wherein such set of minimum spaces comprises at least one standard intermodal-transport shipping-container.

In accordance with another preferred embodiment hereof, this invention provides a method related to reducing vehicular transportation costs associated with the transport of at least one engine-generator unit, such method comprising the steps of: selecting at least one transport mode to physically transport such at least one engine-generator unit; determining for such at least one transport mode at least one set of hauling-capacity constraints associated with a maximum hauling capacity of such at least one transport mode; determining for such at least one engine-generator unit at least one set of minimum performance parameters; determining for such at least one engine-generator unit at least one set of possible physical enclosure configurations capable of packaging at least one engine-generator unit comprising such minimum performance parameters; selecting from such at least one set of possible physical packaging configurations at least one transport-compliant set of physical packaging configurations, each one falling substantially within such at least one set of hauling-capacity constraints; calculating for such at least one transport-compliant set physical packaging configurations, unit production costs associated with each; and selecting from such at least one transport-compliant set physical packaging configurations, at least one transport-compliant set physical packaging configuration falling within at least one acceptable unit production cost goal; wherein at least one minimum performance parameter of such at least one set of minimum performance parameters comprises a peak electrical output of about one megawatt. Each and every novel feature, element, combination, step and/or method disclosed or suggested by this patent application.

BRIEF DESCRIPTION OF THE DRAWINGS

FIG. 3 shows a top view of the mobile generator set according to the preferred embodiment of FIG. 1.

FIG. 4 shows a front view of the mobile generator set of FIG. 1.

FIG. 9C shows side view of the preferred master rod of FIG. 9A.

FIG. 9D shows the detail view 9D of FIG. 9B illustrating preferred arrangements of the "big end" of the master rod of FIG. 9A.

FIG. 15 shows a side view of the mobile generator set containerized within a standard intermodal-transport shipping-container, according to an alternate preferred embodiment of the present invention.

FIG. 16A shows a side view of a cylinder barrel of the radial power plant of FIG. 7A, according to a preferred embodiment of the present invention.

FIG. 16B shows a sectional view through the section 16B-16B of FIG. 16A illustrating preferred geometric arrangement of the cylinder barrel of FIG. 16A.

FIG. 16C shows a partial side view of the detail view 16C of FIG. 16A, enlarged for magnification purposes.

DETAILED DESCRIPTION OF THE BEST MODES AND PREFERRED EMBODIMENTS OF THE INVENTION

Figure 1:
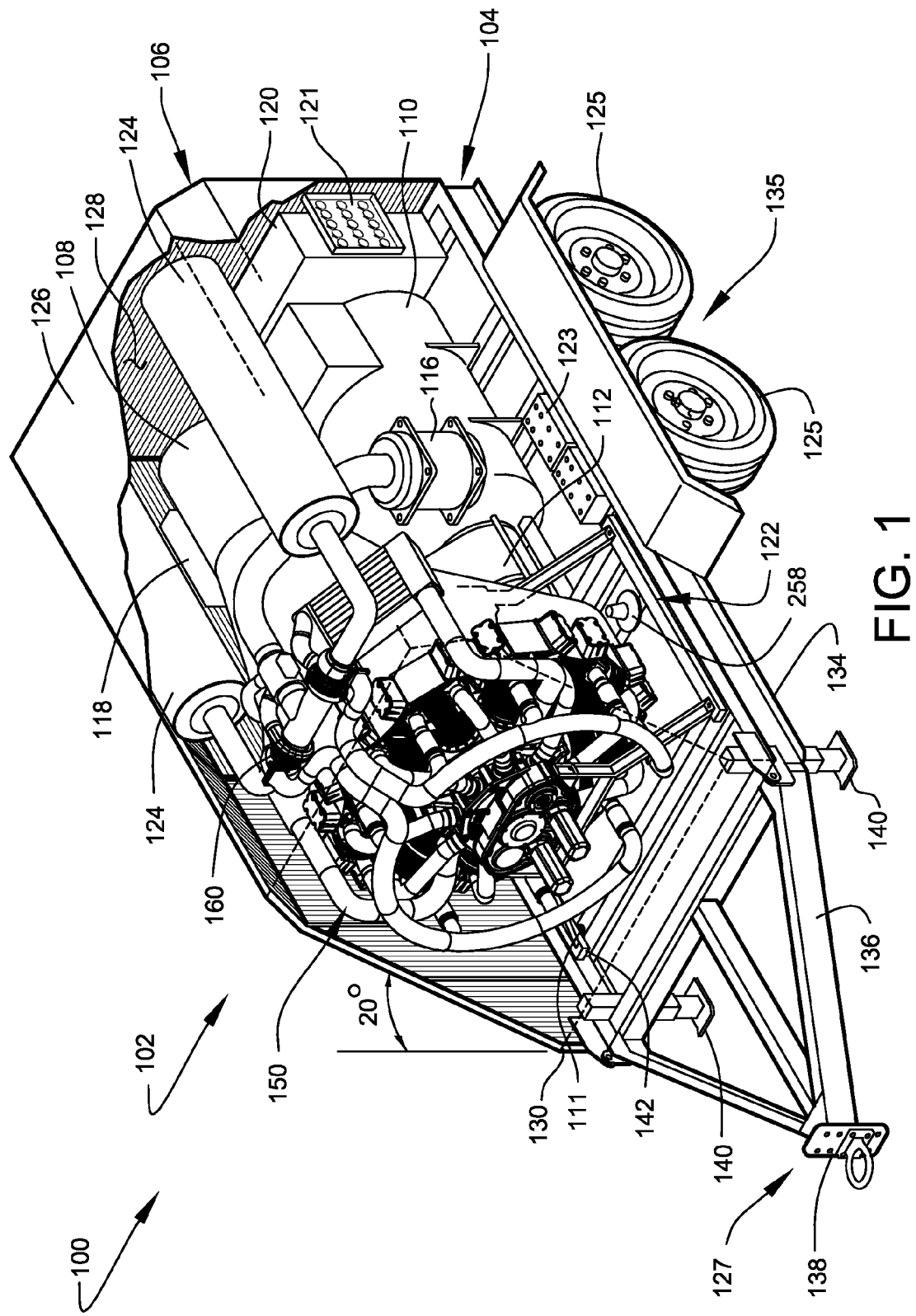
FIG. 1 shows a perspective view, in partial section, of a lightweight and compact mobile generator set, according to a preferred embodiment of the present invention.
Figure 2:
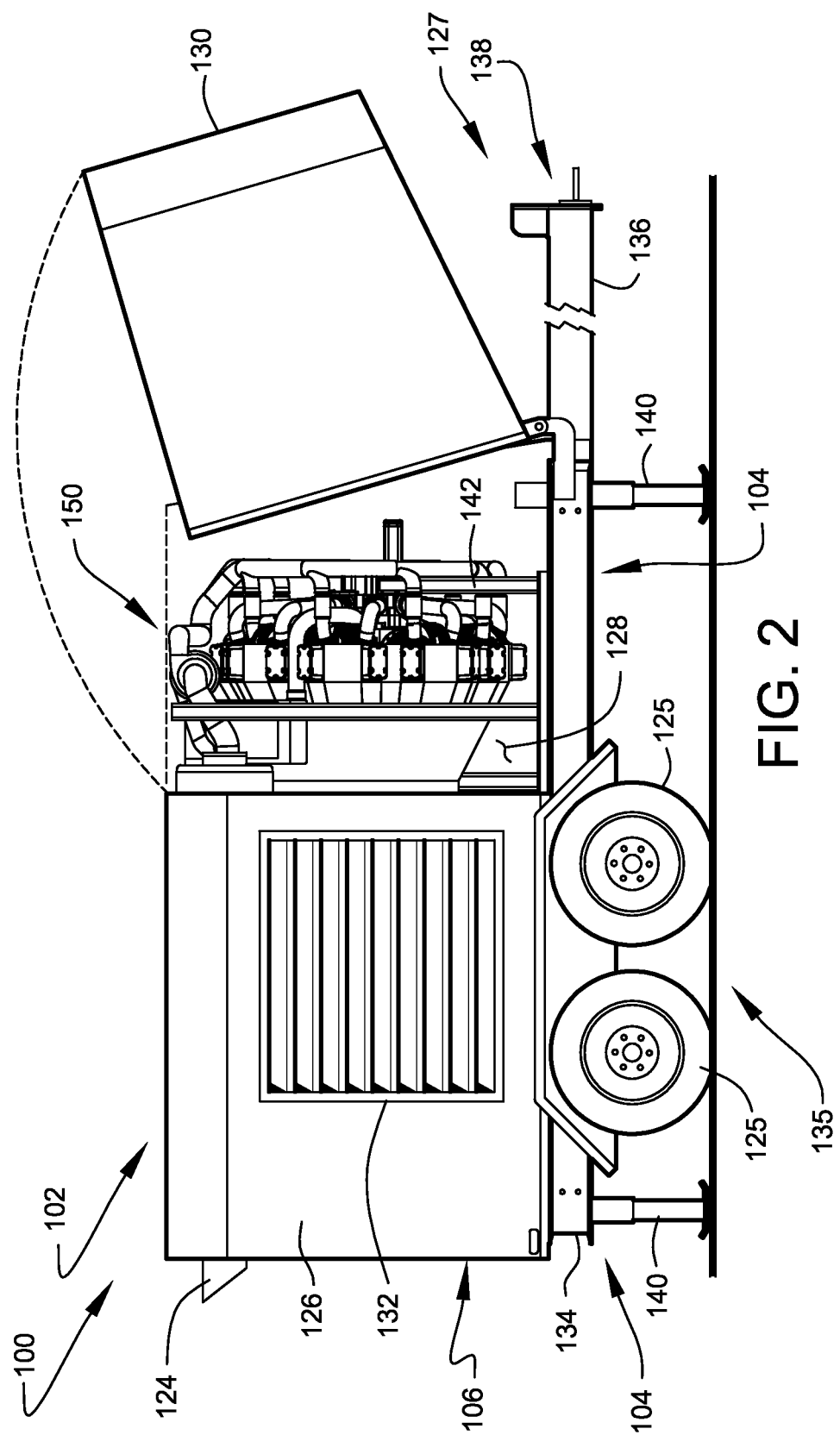
FIG. 2 shows a side view of the mobile generator set of FIG. 1 with an outer housing of the mobile generator set arranged in an open configuration.

FIG. 1 shows a perspective view, in partial section, of a highly compact mobile generator set 102 capable of producing electrical power at megawatt output levels, according to a preferred embodiment of the present invention. For clarity of description, a portion of outer enclosure 106 of mobile generator set 102 has been omitted from the illustration of FIG. 1 to better depict the preferred internal arrangements of the apparatus. FIG. 2 shows a side view of the same mobile generator set 102 with a forward portion of outer enclosure 106 arranged to an open configuration.

The preferred embodiments of portable energy generation system 100, including generator set 102 described herein, preferably comprise high-output electrical generators exhibiting the preferred physical characteristics of compact size, low weight, the ability to use a wide range of conventional fuels, and superior operational reliability. During developmental testing, using industry-standard test conditions, preferred embodiments of portable energy generation system 100 produced a sustained three-phase 60-Hertz output of one megawatt, from a unit having a physical size about one-half that of conventional diesel or natural gas-powered generators of similar capacity.

Generator set 102 preferably comprises at least one prime mover, preferably at least internal combustion motor, most preferably a highly-compact and power-dense internal combustion motor identified herein as radial power-generation unit 150. Radial power-generation unit 150 preferably comprises a piston-driven engine structured and arranged to produce at least one output of rotary power from the combustion of at least one liquid or gaseous fuel. In a preferred arrangement of the apparatus, the rotary power output of radial power-generation unit 150 is operationally coupled with at least one electrical generator 110, as shown. The unexpectedly high power density of generator set 102 is principally enabled by the selection and use of a powerful but compact radial-type power plant, in combination with a compactly-organized arrangement of supporting system components, as further described below.

Radial power-generation unit 150, electrical generator 110, and the supporting operational components of generator set 102 are preferably housed within outer enclosure 106, preferably providing both weather protection and sound attenuation. Radial power-generation unit 150 is preferably arranged directly forward of electrical generator 110, as shown. The remaining generator components, such as, for example, electrical control subsystem 120, fan ducting 108, torque-transmission unit 112, air cleaner 116, oil filtration subsystem 118, fuel-delivery components 122, batteries 123, and exhaust silencers 124 are preferably positioned in a compact arrangement around radial power-generation unit 150 and electrical generator 110, as shown.

The preferred configuration of radial power-generation unit 150 comprises a high power-to-weight ratio. Thus, utilization of radial power-generation unit 150 as the prime mover of generator set 102 preferably reduces the overall weight of the apparatus. The preferred low weight and compact size of generator set 102 permits the unit to be supported on towable trailer chassis 104 (at least embodying herein at least one wheeled chassis), thus forming the preferred embodiment of FIG. 1.

Outer enclosure 106 is preferably constructed using a plurality of substantially weather-resistant outer panels 126 preferably secured to an underlying framework of supporting members 107, preferably comprising a welded assembly of tube and angular steel structured and arranged to rigidly mount outer enclosure 106 to towable trailer chassis 104 (at least embodying herein at least one mount structured and arranged to mount such outer housing to such at least one wheeled chassis). Outer panels 126 preferably comprise at least one weather-resistant material, most preferably lightweight sheet metal. Under appropriate circumstances, considering issues such as cost, intended use, etc., other material arrangements such as, for example, fiberglass-reinforced panels, molded polymers, etc., may suffice.

Towable trailer chassis 104 preferably comprises a rigid structural frame 134 adapted to provide a supportive mounting structure for outer enclosure 106 and the electrical generation apparatus contained therein. Structural frame 134 preferably comprises a principal assembly of 8-inch deep I-shaped steel members preferably supporting a plurality of rigid cross members. The rolling components of towable trailer chassis 104 preferably comprises dual tandem axles 135 mounted to structural steel frame 134 using a conventional leaf-spring suspension, as shown. The dual tandem axles 135 preferably comprise a braking axle of about 8000 pound capacity in combination with either a second braking axle or idler axle both of about 8000 pound capacity. Each axle is fitted with a set of road wheels 125 preferably comprising rubber pneumatic tires, as shown.

Structural frame 134 preferably comprises at least one hitch assembly 127 structured and arranged to couple towable trailer chassis 104 to a towing vehicle. Hitch assembly 127 preferably comprises an A-frame tongue 136 extending from the forward end of structural frame 134, as shown. Tongue 136 preferably supports at least one hitch device, most preferably a 4-bolt, multi-position pintle-type hitch 138, as shown. Pintle-type hitch 138 preferably comprises at least one height-adjustable lunette eye, as shown, attachable to a pintle hook of the towing vehicle. Upon reading this specification, those with ordinary skill in the art will now appreciate that, under appropriate circumstances, considering such issues as cost, type of towing vehicle, regional regulations, etc., other hitch arrangements such as, for example, gooseneck 5th-wheel hitches, ball hitches, etc., may suffice.

Four ground-engaging drop leg jacks 140 are preferably mounted at each corner of structural frame 134 to support and stabilize towable trailer chassis 104 when disengaged from the towing vehicle. Each drop leg jack 140 comprises a telescoping assembly operated by mechanical, hydraulic, or electric means. In addition towable trailer chassis 104 is preferably equipped with all U.S. Department of Transportation (DOT) required equipment, preferably including tail lights, brake lights, side marker lights, turn signals, side and rear reflectors, etc. Upon reading this specification, those with ordinary skill in the art will now appreciate that, under appropriate circumstances, considering such issues as regional regulations, insurance requirements, etc., the employment of other towing-related equipment such as, for example, breakaway switches, provisions for safety chains, backup signals, etc., may suffice.

External access to the internal volume 128 of outer enclosure 106 is preferably provided by an arrangement of access doors, preferably including a large pivoting forward section 130 structured and arranged to provide full inspection and service access to radial power-generation unit 150. Air circulation through outer enclosure 106 is preferably facilitated by a set of vents 132 located within outer panels 126.

Preferably, an electrical load is coupled to the output of mobile generator set 102 at an externally-accessible distribution panel 121, as shown in FIG. 1. Distribution panel 121 preferably comprises three banks of three-phase receptacles, preferably protected by breakers, preferably rated up to 600 VAC at 400 amperes continuous service. Distribution panel 121 preferably comprises a NEMA-approved housing containing three "POSI-LOK" EO400 series sequential interlock panels supplied by Couse-Hinds of LaGrange, N.C.

Outer enclosure 106 preferably comprises an overall length A of about 4 meters (13 feet) and an overall width B of about 1.8 meters (six feet) as best illustrated in top view of FIG. 3. FIG. 4 shows a dimensioned front view of mobile generator set 102 illustrating the preferred enclosure height C of about two meters (six feet eight inches). The above-noted compact physical dimensions of outer enclosure 106 enables mobile generator set 102 to be legally transported on most public highways of North America. To reduce wind drag during towing, the forward end 109 of outer enclosure 106 is preferably reclined about 20 degrees from vertical, as shown. Alternately preferably, generator set 102 is accommodated within a standard ISO-type shipping container for intermodal transport, as illustrated in FIG. 15.

Excluding fuel, mobile generator set 102 comprises a preferred towing weight of about 7,200 kilograms (15,850 pounds). This allows mobile generator set 102 to be towed by a standard one-ton pickup truck operated by a non-commercial driver.

Figure 5A:
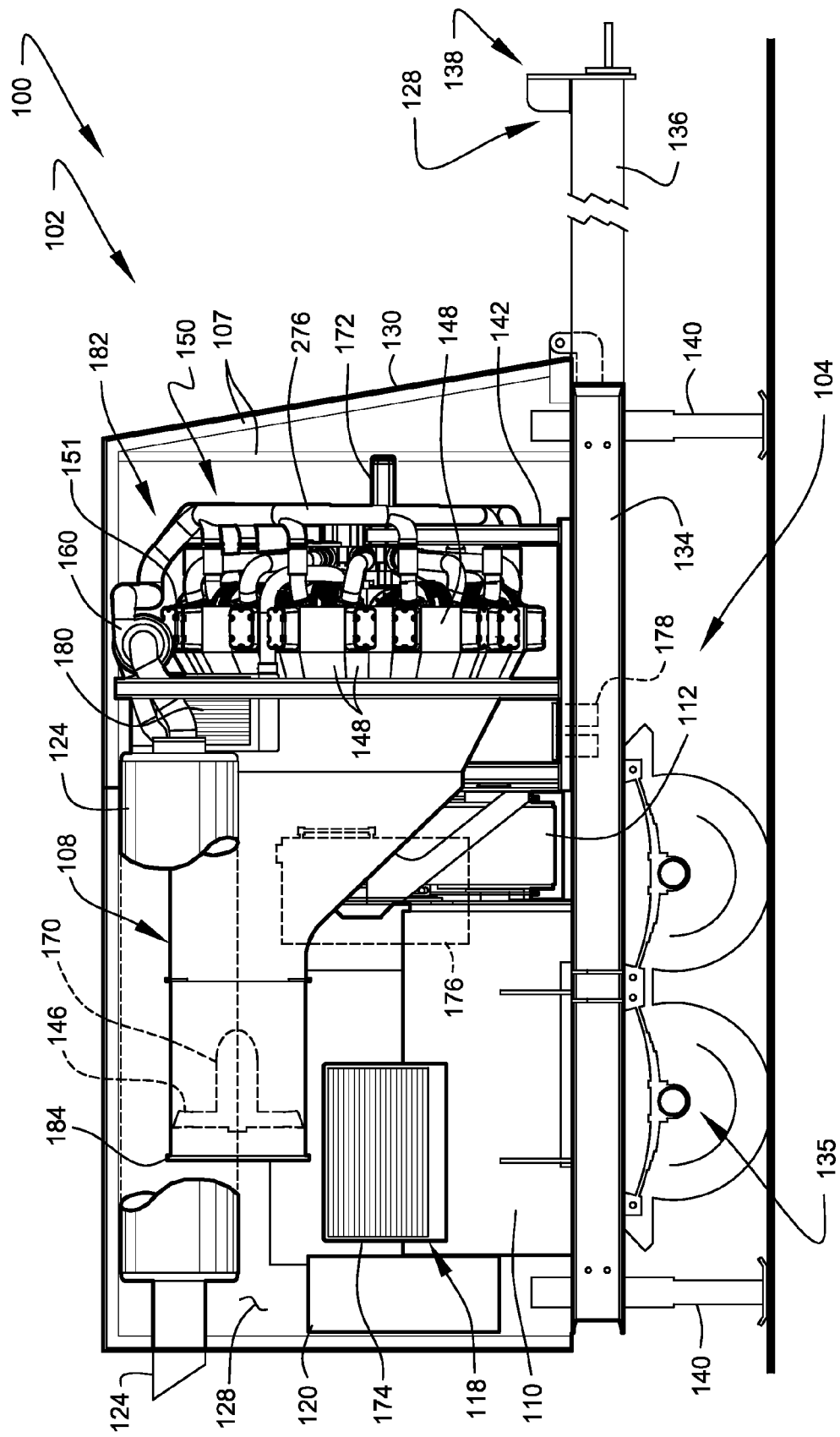
FIG. 5A shows a sectional view through the section 5A-5A of FIG. 3 illustrating preferred internal arrangements of the mobile generator set of FIG. 1.
Figure 5B:
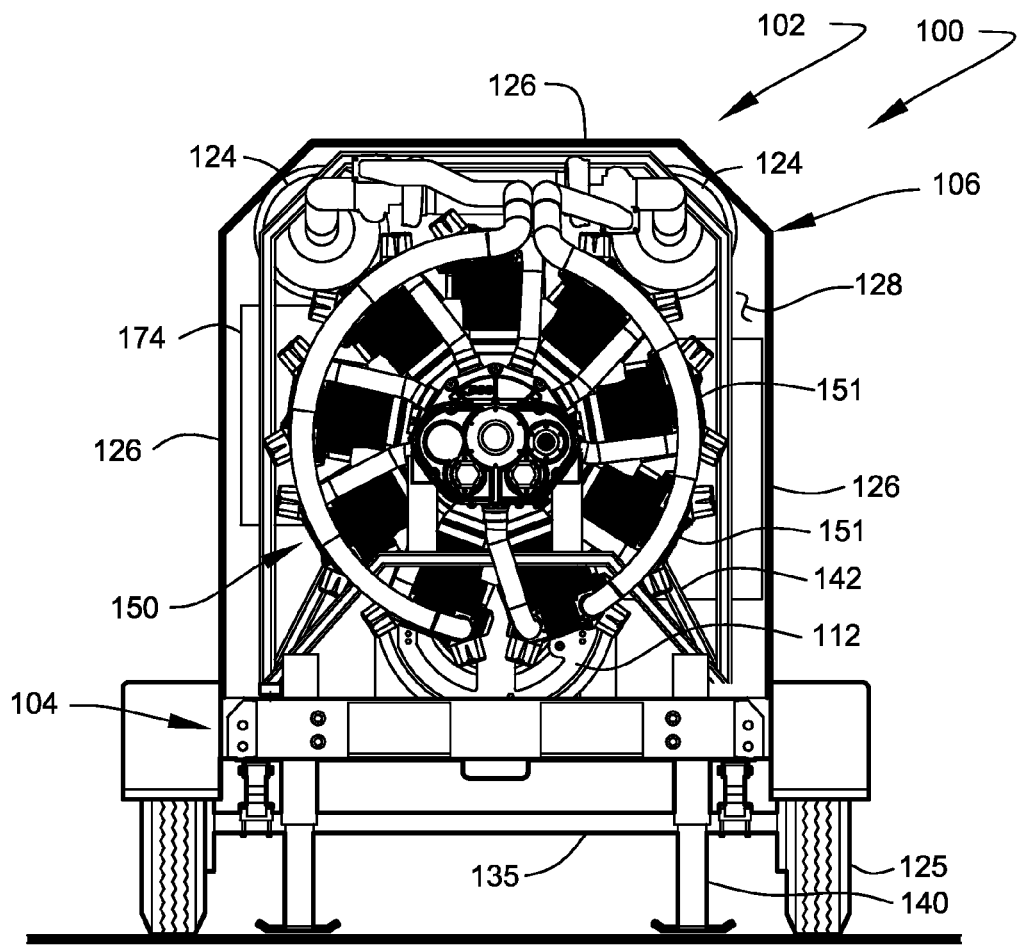
FIG. 5B shows a sectional view through the section 5B-5B of FIG. 3 further illustrating preferred internal arrangements of the mobile generator set of FIG. 1.

FIG. 5A shows a sectional view through the section 5A-5A of FIG. 3 illustrating preferred internal arrangements of mobile generator set 102 of FIG. 1. FIG. 5B shows a sectional view through the section 5B-5B of FIG. 3 further illustrating preferred internal arrangements of mobile generator set 102.

Figure 7A:
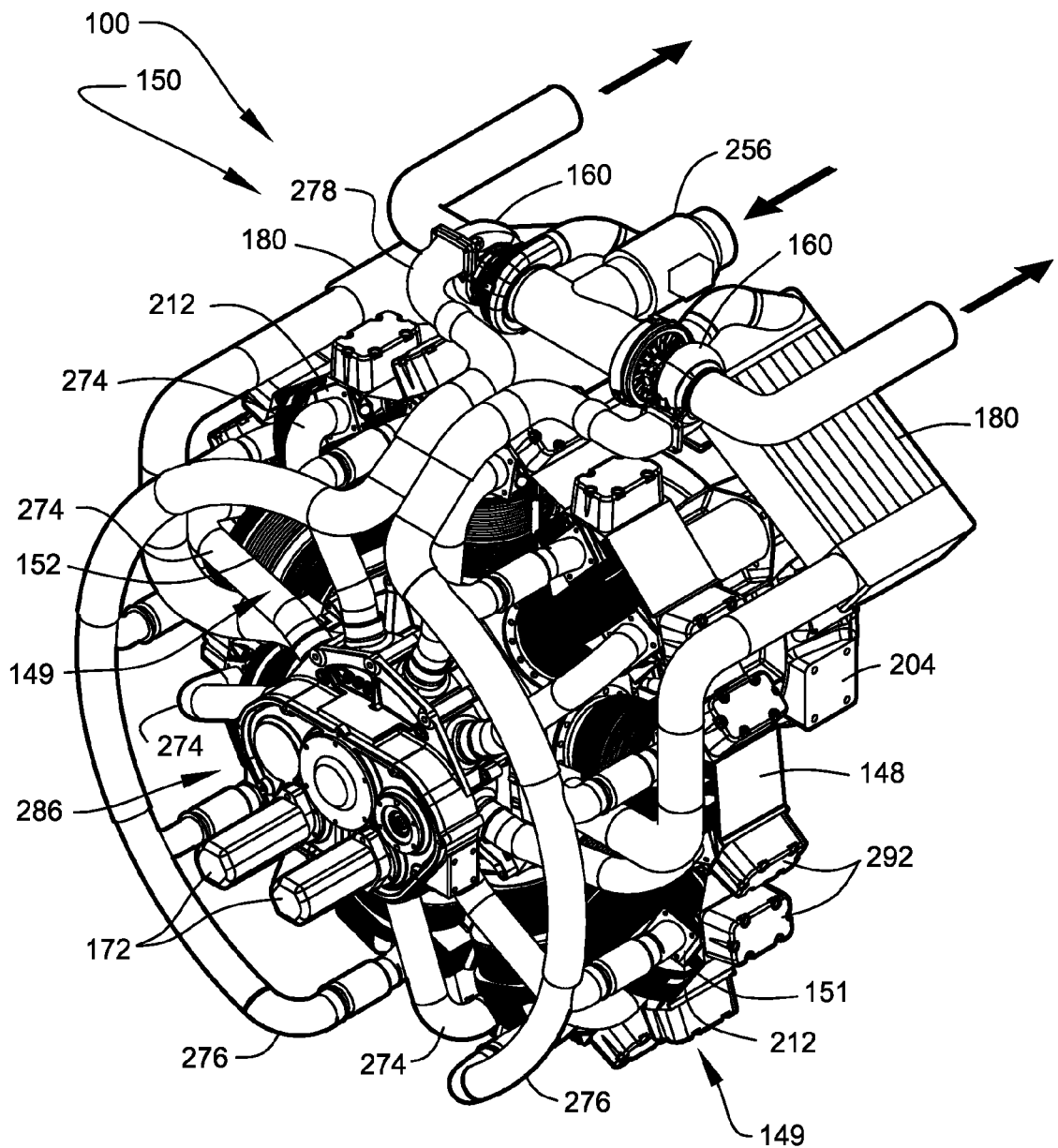
FIG. 7A shows a first perspective view, illustrating a radial power plant structured and arranged to function as the prime mover for the mobile generator set FIG. 1, according to a preferred embodiment of the present invention.
Figure 7B:
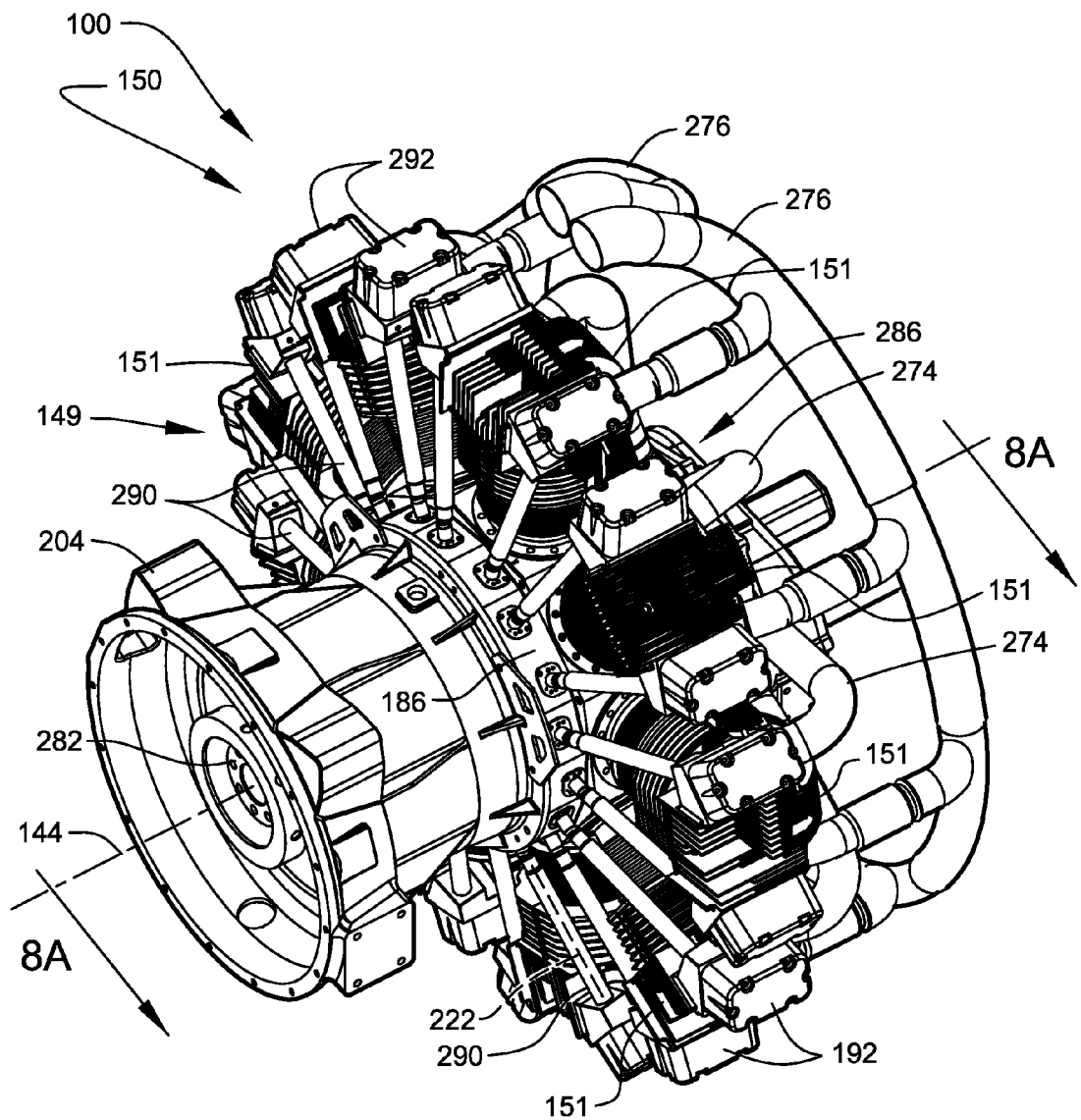
FIG. 7B shows a second perspective view, illustrating the power output side of the radial power plant of FIG. 7A.

Radial power-generation unit 150 is supported from the forward portion of structural frame 134 by a vibration-isolating engine cradle 142, as shown. Engine cradle 142 is preferably coupled to mounting points located at both the forward end and aft end of radial power-generation unit 150 and preferably functions to transfer vertical loads, such as the weight of the engine, in addition to torque loads generated by the engine during operation. Within the present disclosure, the term aft or rear, shall be understood to indicate the power output side of the engine (as illustrated in FIG. 7B), with the term forward or front indicating the opposing side (as illustrated in FIG. 7A). Engine cradle 142 preferably comprises a welded assembly of steel channels supported from tube steel base members. Engine cradle 142 is preferably isolated from the supporting structural frame 134 by cylindrical elastomeric vibration isolators 111, as shown.

Electrical generator 110 is preferably located aft of radial power-generation unit 150 at an elevation below the power output axis 144 power-generation unit 150 (see also FIG. 6A). This preferred arrangement lowers the overall center of gravity of the embodiment and permits the rotational power output of radial power-generation unit 150 to be transferred to electrical generator 110 through torque-transmission unit 112 located between electrical generator 110 and radial power-generation unit 150, as shown. An onboard electrical control subsystem 120, which preferably monitors and controls both engine performance and generator output, is preferably housed in a cabinet positioned aft of electrical generator 110, as shown.

Primary engine cooling for radial power-generation unit 150 is preferably provided by air drawn over cylinder heads 151 and finned cylinder barrels 152 of the power plant (see FIG. 7A and FIG. 7B). In a preferred embodiment of the present system, cooling airflow is preferably generated by axial fan 146 located aft of radial power-generation unit 150 within fan ducting 108 projecting outwardly from the power-output side of radial power-generation unit 150, as shown. Sheet metal cylinder shrouding 148, preferably located between cylinder heads 151, functions to direct the air moving through the engine to fan ducting 108. The lower portion of fan ducting 108 is preferably shaped to provide necessary clearance around transmission unit 112, as shown. The upper portion of fan ducting 108 comprises secondary ducting adapted to draw cooling air through a pair of heat-exchanging intercoolers 180 of engine-induction assembly 182. Fan ducting 108 preferably transitions to a substantially hollow cylindrical discharge section 184 that preferably contains axial fan 146, as shown.

Axial fan 146 preferably comprises a multi-bladed module having a central hub coupled to a hydraulic fan motor 170. Hydraulic fan motor 170 is preferably powered by hydraulic fluid pressurized by at least one hydraulic pump preferably driven by radial power-generation unit 150. The hydraulic circuit driving fan motor 170 may preferably comprise controllable valving to enable adjustments to the speed and output of axial fan 146; thus, the output of axial fan 146 can be actively altered to generally match the heat-rejection demands of radial power-generation unit 150.

Figure 6A:
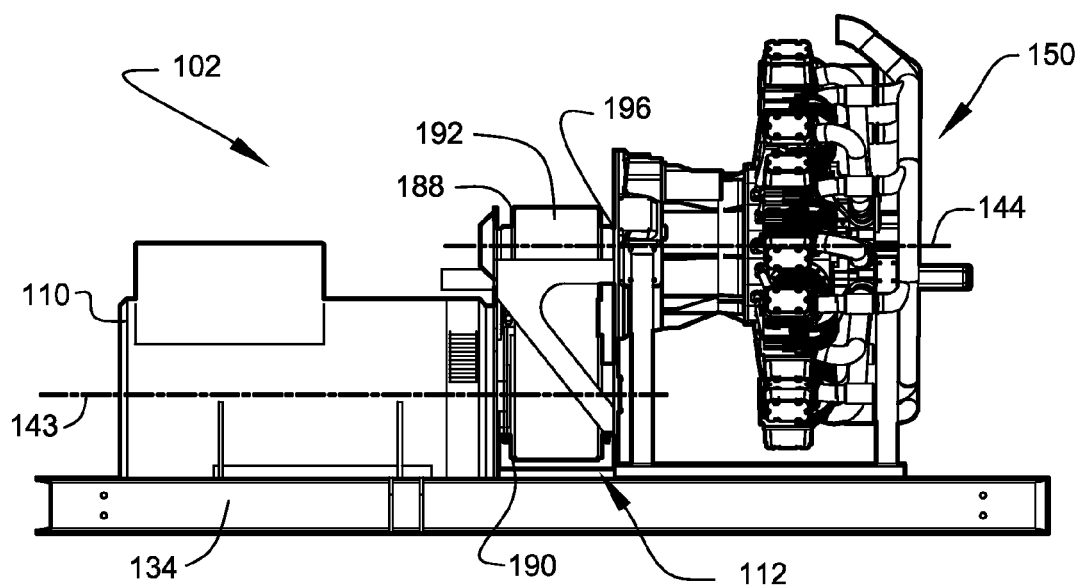
FIG. 6A shows a side view illustrating a preferred arrangement of principal operating components of the mobile generator set of FIG. 1.
Figure 6B:
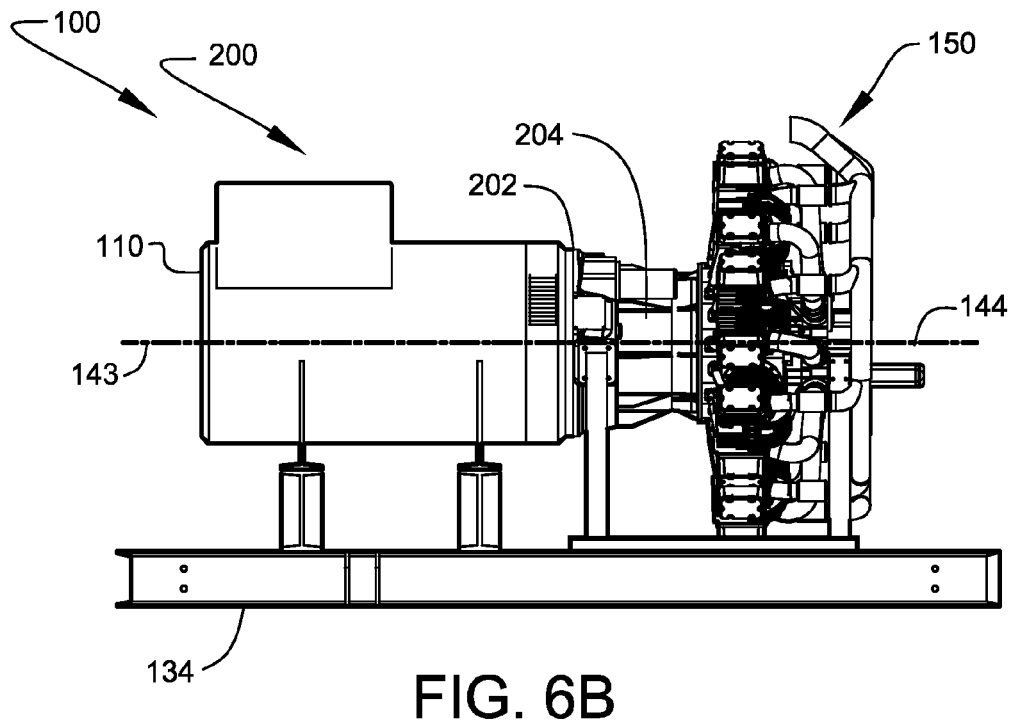
FIG. 6B shows a side view illustrating an alternate preferred arrangement of the principal operating components of the mobile generator set of FIG. 1.
Figure 6C:
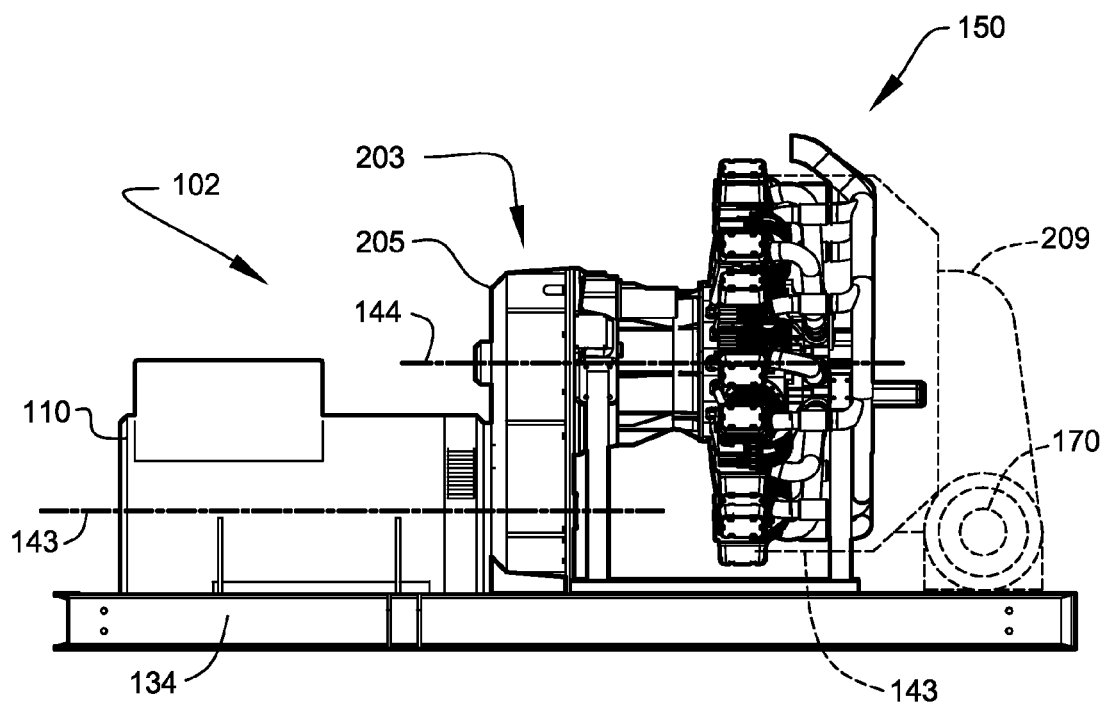
FIG. 6C shows a side view illustrating an alternate preferred arrangement of the principal operating components of the mobile generator set of FIG. 1.

Alternately preferably, cooling airflow is provided by one or more hydraulically-driven centrifugal fans located forward of the power plant, as best illustrated in FIG. 6C. Upon reading this specification, those with ordinary skill in the art will now appreciate that, under appropriate circumstances, considering such issues as cost, anticipated operating temperatures, etc., other fan arrangements such as, for example, the use of electric fan motors, the use of fan elements directly driven by the radial engine, the use of water-cooled jackets, etc., may suffice.

Secondary cooling of radial power-generation unit 150 is preferably provided by oil filtration subsystem 118. Oil filtration subsystem 118 preferably comprises remotely-mounted full-flow oil filters 178, oil cooler 174, and oil reservoir 176, as shown. Each component of oil filtration subsystem 118 is preferably coupled by a set of oil distribution lines (not shown) enabling fluid communication with an engine-driven oil circulation pump 172 of radial power-generation unit 150. Oil filtration subsystem 118 preferably functions as an extension of the general engine oiling system of radial power-generation unit 150, which preferably includes pressure and scavenging pumps, oil distribution lines, etc. Oil cooler 174 preferably comprises active cooling preferably provided by at least one motorized fan operated by a 12-volt or 24-volt direct current (DC) source. Oil coolers suitable for use as oil cooler 174 preferably include a model OAD unit supplied by Oilair Hydraulics, Inc. of Houston, Tex.

Engine exhaust is preferably discharged through two exhaust silencers 124, preferably positioned in the upper portion of the internal volume 128 of outer housing 106, preferably flanking each side of discharge section 184, as shown. Each exhaust silencer 124 functions to reduce the decibel sound output of mobile generator set 102 during operation. Each exhaust silencer 124 preferably discharges at a point external of outer housing 106, as shown.

FIG. 6A shows a side view illustrating a preferred arrangement of principal operating components of mobile generator set 102, according to the preferred embodiment of FIG. 1. It is noted that outer housing 106, fan ducting 108, exhaust silencers 124, oil filtration subsystem 118, and similar secondary components have been omitted from the illustration of FIG. 6A to assist in describing the preferred relationship between electrical generator 110 and radial power-generation unit 150.

The rotational power output of radial power-generation unit 150 is preferably transferred to the internal armature of electrical generator 110 through torque-transmission unit 112 located between electrical generator 110 and radial power-generation unit 150, as shown. The rotational output of radial power-generation unit 150, preferably located at power output axis 144, is preferably oriented so as to be substantially parallel with the lower input shaft axis 143 of electrical generator 110, as shown. Torque-transmission unit 112 preferably comprises a belt-type drive mechanism; preferably comprising a cylindrical upper pulley 188 coupled to the rotational output of radial power-generation unit 150, a cylindrical lower pulley 190 coupled to the input shaft of electrical generator 110, and at least one transmission belt 192 coupling the rotary motion of upper pulley 188 with lower pulley 190.

The velocity ratio between the rotations of lower pulley 190 and upper pulley 188 is preferably established to properly match the rotational speed of radial power-generation unit 150 to the preferred operational input speed of generator 110. In the United States, where the preferred electrical frequency is 60 hertz, the preferred shaft speed of the 4-pole generator 110 is the industry standard 1,800 revolutions per minute (RPM). The output speed of radial power-generation unit 150 is preferably matched to this speed by proper selection of pulley diameters.

Both upper pulley 188 and lower pulley 190 preferably comprise central hubs journaled in forward and aft bearings, preferably held within supportive frame 194 rigidly mounted to structural frame 134. Frame 194 preferably comprises a rigid metal construction, with accommodations for straightforward disassembly enabling drive-belt renewal. Both upper pulley 188 and lower pulley 190 preferably comprise metallic V-belt sheaves having machined outer grooved surfaces adapted to receive one or more V-type belts. Transmission belt 192 preferably comprises a side-by-side arrangement of six V-belts, each one preferably comprising a model 5VF950 Torque Team Plus banded belt as supplied by Goodyear Rubber Products Inc. Tension of transmission belt 192 is preferably maintained by mechanically adjustment.

At least one elastomeric coupler 196 is used to couple upper pulley 188 to the output shaft of radial power-generation unit 150. This preferred arrangement has been found to be beneficial when using belt-type torque-transmission units of the type described herein. Elastomeric coupler 196 functions to accommodate moderate amounts of axial misalignment during operation, in addition to reducing transmission of engine vibrations to the drive train structures. Elastomeric couplers suitable for use as elastomeric coupler 196 include OMEGA brand elastomeric couplers produced by Rexnord Elastomer Products of New Berlin, Wis.

In a preferred embodiment of the present invention, upper pulley 188 is fitted with a toothed ring gear that is preferably engaged by a 24-volt DC solenoid-equipped electric cranking motor, thus allowing torque-transmission unit 112 to function as a starter mechanism for radial power-generation unit 150. Upon reading this specification, those with ordinary skill in the art will now appreciate that, under appropriate circumstances, considering such issues as intended use, power output of the prime mover, etc., other mechanical transmission arrangements such as, for example, gear drives, chain drives, hydraulic couplers, clutches, etc., may suffice.

Generator 110 preferably comprises a four pole synchronous generator with a rated capacity of about 1000 kW, at an operational speed of about 1800 RPM (with an over-speed capacity of about 2250 RPM). Generator 110 preferably outputs three-phase 480-volt alternating current (AC). Generator 110 preferably comprises an approximate weight of about 2300 kilograms (about 5,000 pounds). A preferred generator unit suitable for use as generator 110 includes model MJB_400_MB4 supplied by Marelli Motori of Arzignano (VI) Italy.

FIG. 6B shows a side view illustrating a preferred alternate arrangement 200 of the principal operating components of mobile generator set 102 of FIG. 1. In alternate arrangement 200 torque-transmission unit 112 is omitted in favor of a substantially direct coupling of electrical generator 110 and radial power-generation unit 150, as shown. In the preferred arrangement of FIG. 6B, power output axis 144 and shaft axis 143 are aligned coaxially, thus allowing a substantially direct mechanical coupling of electrical generator 110 and radial power-generation unit 150. A least one interface assembly 202 is used to adapt power take off 204 of radial power-generation unit 150 to the input flange of electrical generator 110, as shown. It is noted that direct coupling requires the operational speed and available shaft horsepower of radial power-generation unit 150 to be substantially equal to the required input speed and input shaft horsepower required by electrical generator 110. Thus, the use of alternate arrangement 200 requires the power-curve of radial power-generation unit 150 to be shifted to provide the required drive torque at the 1,800 RPM rotational input required by the 4-pole generator. This may be accomplished by increasing the bore and stroke of radial power-generation unit 150. The power curve may be further shifted through modifications to combustion-chamber shape, valve lift, and intake/exhaust valve overlap, as known to those of ordinary skill in the art of internal combustion piston engines. Upon reading this specification, those with ordinary skill in the art will now appreciate that, under appropriate circumstances, considering such issues as engine configuration, cost, etc., other coupler arrangements such as, for example, the use of gear-reduction assemblies, vibration dampers, clutch mechanisms, universal joints, fluid or magnetic couplers, etc., may suffice. Furthermore, those with ordinary skill in the art will now appreciate that, under appropriate circumstances, considering such issues as engine efficiency, maximum engine outputs, cost, etc., other generator arrangements such as, for example, the use of a large 2-pole generator to allow the prime mover to operate at peak (high RPM) efficiency, etc., may suffice.

FIG. 6C shows a side view illustrating alternate preferred arrangement 201 of the principal operating components of mobile generator set 102 of FIG. 1. In alternate arrangement 201 torque-transmission unit 112 is omitted in favor of a compact torque-transmitting gearbox 203, as shown. The rotational power output of radial power-generation unit 150 is preferably transferred to the internal armature of electrical generator 110 through gearbox 203, preferably located between electrical generator 110 and radial power-generation unit 150, as shown. Gearbox 203 preferably comprises an internal gear train supported within an outer gearbox housing 205. The rotational output of radial power-generation unit 150 is preferably coupled to the input shaft of electrical generator 110 through the internal gear train, preferably comprising a set of helical gears. Gear ratios are preferably fixed and preferably match the rotational speed of radial power-generation unit 150 to the preferred operational input speed of generator 110 (about 1,800 RPM). Alternately preferably, gearbox 203 may comprise a multi-speed capability to enable radial power-generation unit 150 to operate at lower output speeds consistent with reduced load requirements.

The comparatively compact size of gearbox 203 allows radial power-generation unit 150 to be shifted rearward, thus providing additional internal volume 128 within the forward portion of outer housing 106. This alternate preferred arrangement enables the use of a forward mounted centrifugal fan assembly 209 (as indicated by the dashed-line depiction of FIG. 6C). The fan wheel of centrifugal fan assembly 209 is linked directly to the shaft of hydraulic fan motor 170. Alternately preferably, the fan wheel of centrifugal fan assembly 209 may be linked to the shaft of hydraulic fan motor 170 using a belt drive.

Hydraulic fan motor 170 is preferably powered by hydraulic fluid pressurized by at least one hydraulic pump preferably driven by radial power-generation unit 150. The overall assembly is sized to develop a static pressure of about 15 inches of water column (wc) during operation.

The hydraulic circuit driving fan motor 170 may preferably comprise controllable valving to enable adjustments to the speed and output of hydraulic fan motor 170; thus, the output of centrifugal fan assembly 209 can be actively adjusted to match the heat-rejection demands of radial power-generation unit 150. Cooling airflow is preferably ducted by a forward-mounted plenum in fluid communication with the sheet metal cylinder shrouding 148 surrounding the cylinder heads and cylinder barrels of the power plant.

Specific reference is now made to the preferred structures and arrangements of radial power-generation unit 150. FIG. 7A shows a perspective view, illustrating the overall external arrangement of radial power-generation unit 150. FIG. 7B shows a second perspective view illustrating the power output side of radial power-generation unit 150.

The successful development of the present highly-portable megawatt-class electric generator set required a prime mover exhibiting a low weight-per-horsepower ratio, compact size, and good in-service durability. During development of portable energy generation system 100, applicant determined that a suitable prime mover would require a sustainable power output of about 1,400 brake horsepower and, to facilitate over-the-road portability, a maximum physical width of less than about 1.8 meters (72 inches).

During the development process, applicant identified several possible engine configurations having the necessary physical and performance characteristics. After substantial research and analysis, applicant determined that only a radial-type piston engine afforded the above-noted characteristics, with the additional benefits of proven in-service durability, multi-fuel capability, and relatively low initial production cost.

The preferred design of radial power-generation unit 150 is generally derived from at least one aircraft application. The preferred adapting of a radial aircraft engine for use as radial power-generation unit 150 provides a prime mover capable of sustained high-power output, high operational reliability, and excellent efficiency.

In general, radial power-generation unit 150 comprises a reciprocating-piston engine of radial design, so called due to its radial arrangement cylinders about a central crankshaft. The preferred number of cylinders within radial power-generation unit 150 is odd, most preferably nine. Radial power-generation unit 150 preferably comprises a four-stroke piston engine generally derived from the Curtiss-Wright model R-1820 "Cyclone" radial engine developed and used during the 20th Century. The Curtiss-Wright R-1820 and its derivatives have powered numerous propeller-driven aircraft including helicopters. When properly maintained, the basic R-1820 design was demonstrated to be both reliable and relatively durable in aviation service. Developmental embodiments of mobile generator set 102 where successfully operated using a modified (turbocharged) R-1820-84 unit sourced from a Sikorsky Aircraft Corporation helicopter.

The usefulness of the R-1820 engine in non-aviation applications is severely hindered by the burdensome service intervals and relatively costly maintenance requirements of the power plant. The pure aviation radial engine, although compact and powerful, is especially ill-suited to industrial applications typically served by conventional industrial engines having relatively long service intervals.

Although the basic geometry of power-generation unit 150 is generally derived from the Curtiss-Wright engine, essentially the entire engine is preferably refitted for industrial service and increased performance. This preferably includes strengthening and replacement of a majority of the engine components; more preferably, substantially all of the engine components, as further described below.

Figure 8A:
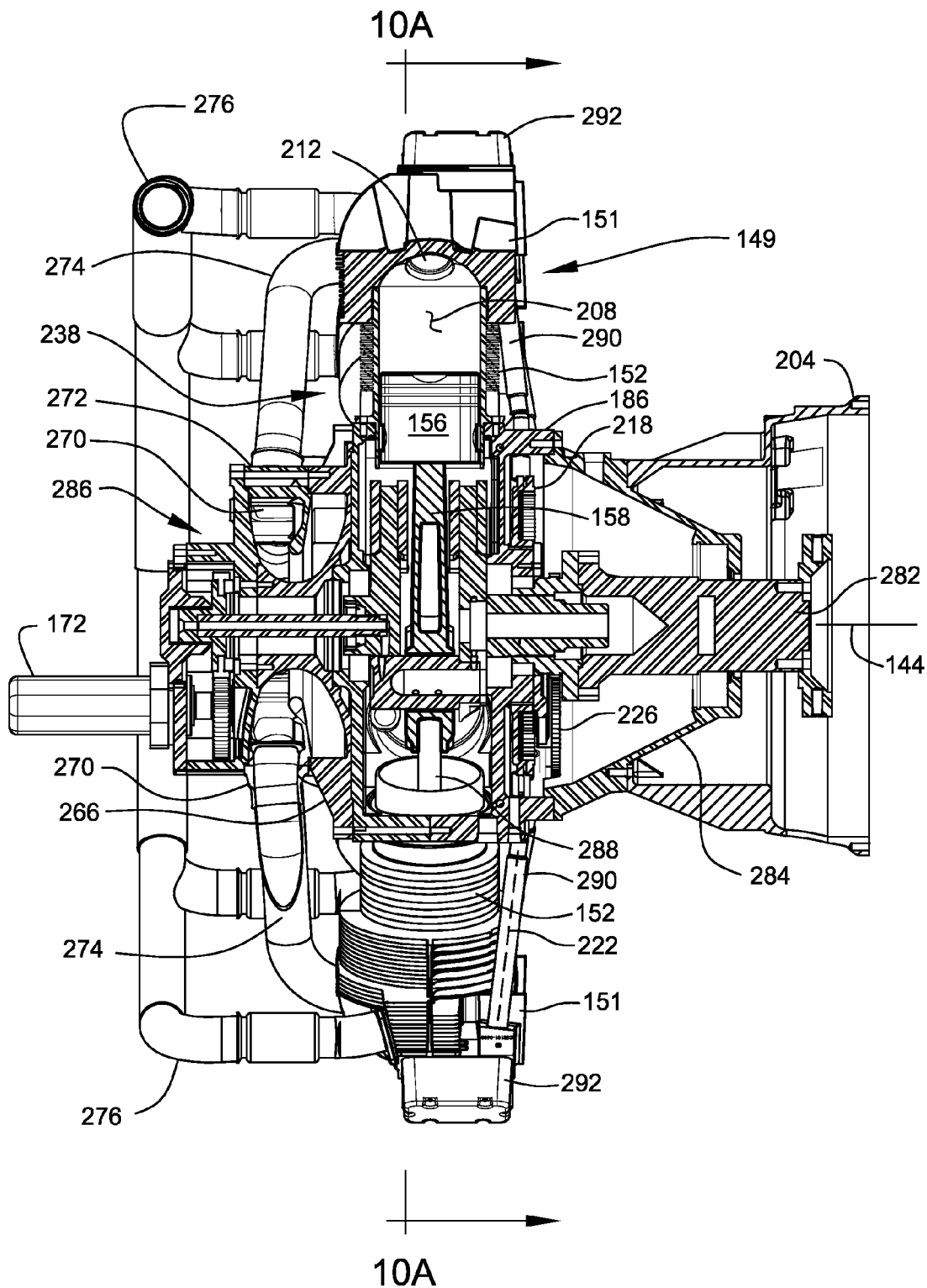
FIG. 8A shows the longitudinal sectional view 8A-8A of FIG. 7B generally illustrating preferred internal component arrangements of the radial power plant of FIG. 7A.
Figure 8B:
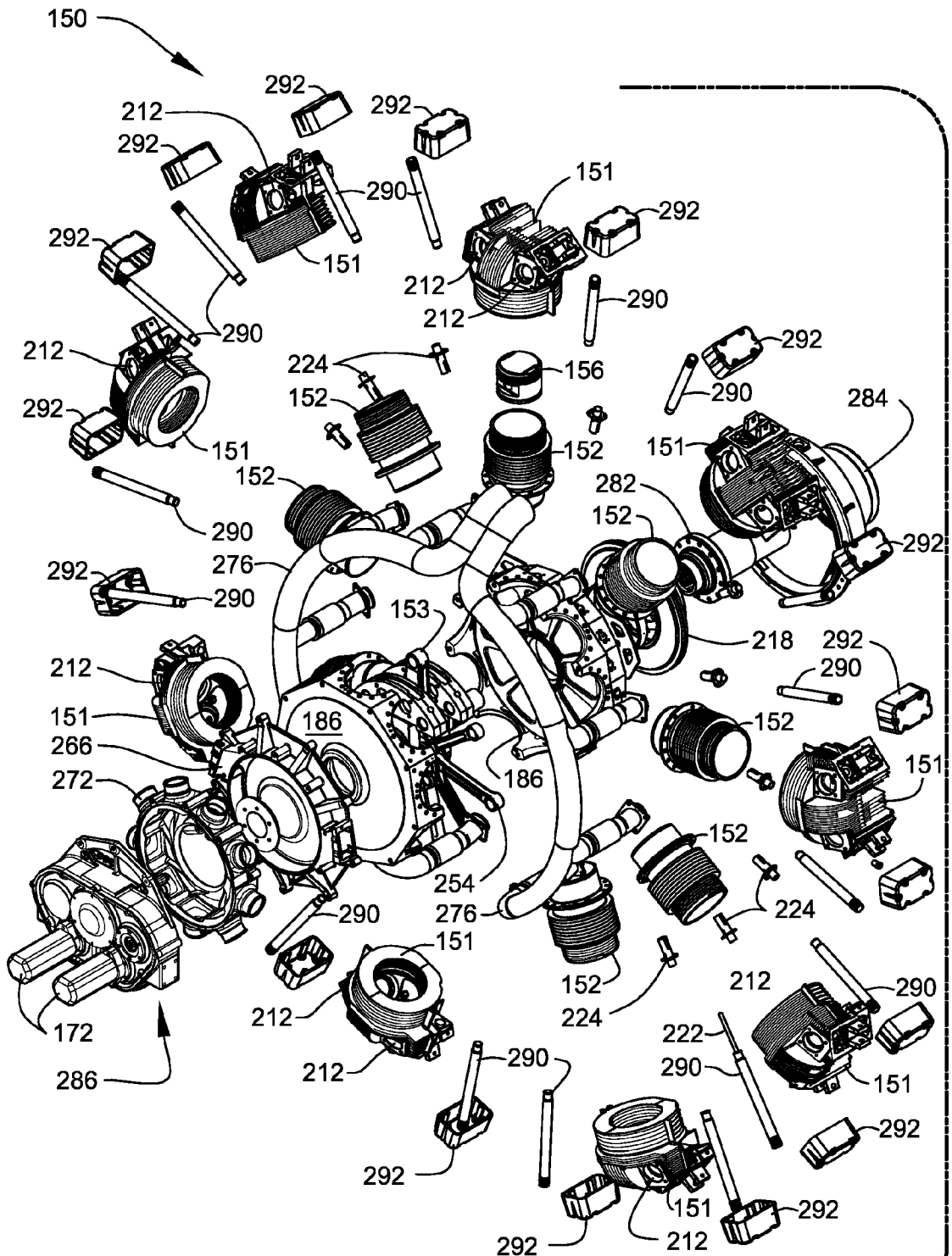
FIG. 8B shows a partial exploded view of the radial power plant of FIG. 7A.
Figure 8C:
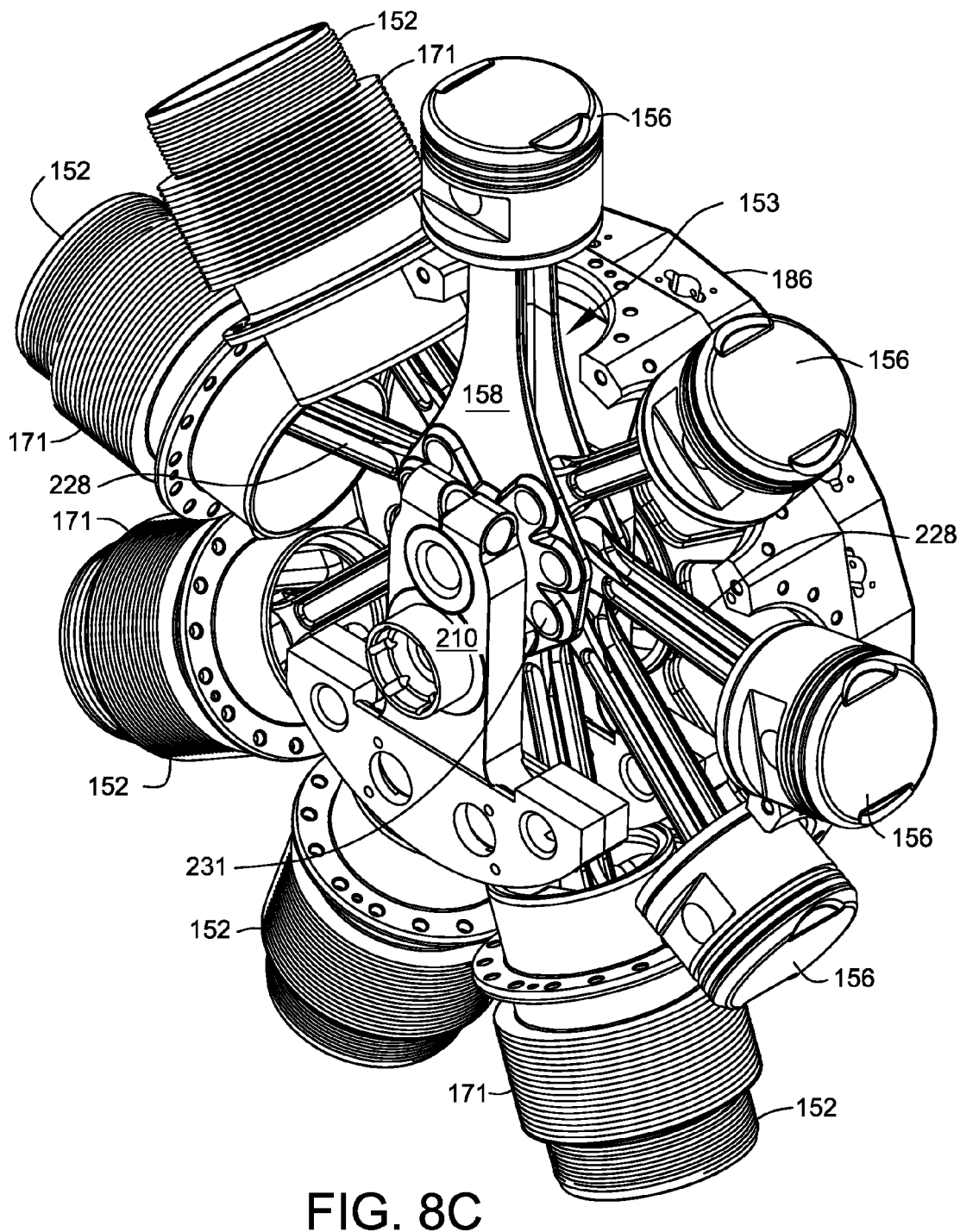
FIG. 8C shows an isolated perspective view of the principal rotating components of the radial power plant of FIG. 7A.
Figure 8D:
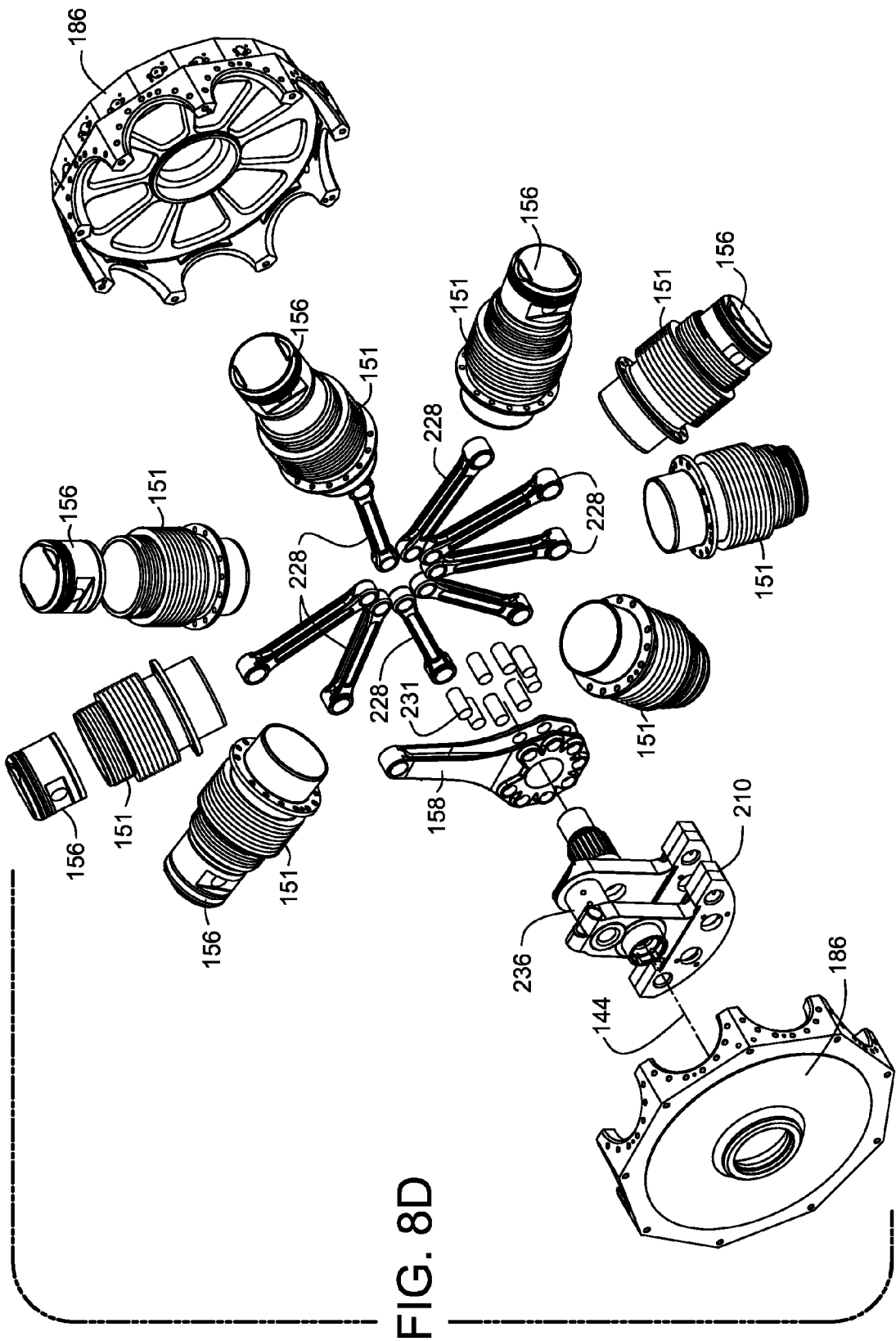
FIG. 8D shows an isolated exploded view of the principal rotating components of the radial power plant of FIG. 7A.

FIG. 8A shows the longitudinal sectional view 8A-8A of FIG. 7B generally illustrating preferred internal component arrangements of radial power plant 150. FIG. 8B shows a partial exploded view of radial power-generation unit 150. FIG. 8C shows an isolated perspective view of the principal rotating components of radial power-generation unit 150. FIG. 8D shows an isolated exploded view of the principal rotating components of radial power-generation unit 150. It is noted that portions of the induction assembly have been omitted from the view of FIG. 7B to allow the underlying structures to be shown.

Radial power-generation unit 150 comprises nine cylinders 149 preferably organized in a compact radial geometry about a two-part crankcase assembly 186, as shown. Spacing between cylinders 149 is preferably 40 degrees. Each cylinder 149 preferably comprises single piston 156 reciprocably disposed within a respective cylinder barrel 152, as shown. Each cylinder barrel 152 comprises a proximal end joined to crankcase assembly 186 and a distal end joined to a cylinder head 151, as shown. Together, piston 156, cylinder head 151, and the interior wall 206 of cylinder barrel 152 form an internal combustion chamber 208 in which the fuel mixture is compressed and burned.

The preferred design of cylinder barrels 152 was developed after extended experimental testing, including careful testing and analysis of the original aviation counterparts. The resulting cylinder barrel comprises an entirely new air-cooled design specifically re-engineered for improved service life (see FIG. 16A through 16C for preferred geometries of cylinder barrels 152). Preferred engineering changes include replacement of the non-structural aluminum cooling fins with an arrangement of structural cooling fins 271 integrally cast about the outer circumference of cylinder barrels 152, as shown. This preferred arrangement was developed to both structurally reinforce the barrel and evenly distribute heat around barrel circumference, greatly-reducing uneven circumferential stress within the cylinder barrel, thus allowing cylinder barrel 152 to better maintain a consistent shape during extended operation.

Each cylinder barrel 152 is preferably constructed from a ferrous alloy. Most preferably, cylinder barrel 152 is modified to comprise a cast iron alloy. Preferred ferrous materials suitable for use in the construction of cylinder barrel 152 preferably include a high-performance boron-alloy cast iron, preferably comprising a chemical composition of about 2.9 to 3.2 percent carbon by weight, about 2.0 to 2.4 percent silicon by weight, about 0.6 to 0.8 percent manganese by weight, about 0.035 to 0.08 percent sulfur by weight, about 0.04 to 0.08 percent boron by weight, about 1.3 to 1.7 percent copper by weight, about 0.25 to 0.4 percent chromium by weight, less than about 0.25 percent phosphorus by weight; with the remaining composition comprising iron. Such boron-alloy cast iron preferably complies with QZZ21028-1996JT standard; preferably comprising criteria of hard structure distribution, size, and amount in compliance with standard JB/T5082-1991; a preferred hardness of between about 280 to 310 Brinell Hardness (HBS) with a preferred hardness variation on same surface of less than or equal to about 30 HBS; and mechanical properties preferably complying with GB 9439 (Grey Iron). Upon reading this specification, those with ordinary skill in the art will now appreciate that, under appropriate circumstances, considering such issues as advances in technology, cost, etc., other materials, such as, for example, SAE 4140 (UNS G41400) ferrous materials, through-hardened or nitrided (depending on the application and service condition), etc., may suffice Cylinder barrels 152 are preferably produced using a shell-molding process. A preferred shell-molding method comprises one of several known processes wherein a heated metal pattern is placed within a mixture of sand and thermoset plastic. The heated pattern (about 200-degrees Centigrade) produces a hardened "shell" within the surrounding sand/plastic mixture, which conforms to the outer surface of the pattern. This shell is separated and removed from the pattern to form the "shell mold" for cylinder barrels 152. The separated portions of the shell mold are secured together and molten iron is poured into the shell to form the part. Once the metal solidifies, the shell is broken free from the casting producing an un-machined barrel. Machining of the cast barrels preferably includes precision boring and a two-stage honing of the internal diameter (see FIG. 16A through 16C for preferred geometries of cylinder barrels 152). In the preferred honing process, rough honing of the barrel wall is preferably followed by profile honing to smooth and plateau the finish. This preferred two-stage honing produces a suitable bearing area to support the rings, while retaining adequate crosshatch depth to retain oil and provide sufficient ring lubrication.

Each cylinder head 151 is preferably structured and arranged to provide valve-assisted control of the intake and exhaust combustion cycle gases. Each cylinder head 151 comprises intake and exhaust valve ports 212 preferably fitted with an accompanying set of intake and exhaust valves of the conventional poppet design. Sodium-filled valves are preferably utilized at the exhaust port to enhance heat dissipation. The valves are preferably maintained in a closed position by the valve springs and are opened by the action of rocker arms pivotally mounted to the cylinder heads 151. The rocker arms (omitted from the illustrations) are preferably actuated by push rods 222, preferably extending within push rod tubes 290 along the back of the engine from cylinder heads 151 to a ring-shaped cam 218 preferably located in the rear section of crankcase assembly 186. Cam 218 preferably comprises a hardened alloy steel ring with sets of cam lobes formed on its outside diameter. Each push rod 222 preferably engages the outer diameter of cam 218 through a tappet roller 224, as shown. Upon reading this specification, those with ordinary skill in the art will now appreciate that, under appropriate circumstances, considering such issues as cost, durability, operating efficiency, etc., other valve-actuation arrangements such as, for example, actuating each push rod using a one-piece hydraulic lifter/rolling cam follower, electromechanical valve actuation, etc., may suffice.

Cam 218 is preferably mounted concentrically with crankshaft 210 and is driven by crankshaft 210 through cam-drive gear assembly 226, which preferably functions to reverse the rotation of the cam relative to crankshaft 210 as well as to reduce its rotation rate. Cam 218 preferably comprises two sets of four lobes spaced around the outer periphery of the cam, one set controlling the intake valves and the other controlling the exhaust valves. Cam lobes are preferably arranged to provide a 1-3-5-7-9-2-4-6-8 firing order.

Cylinder heads 151 preferably comprise metal casings, preferably utilizing a non-ferrous alloy, preferably an improved aluminum alloy. Cylinder heads 151 are preferably modified to comprise an Al—Si—Cu—Mg alloy, preferably substantially matching material specified under the Japanese Industrial Standard (JIS) H 5202 AC4D. Cylinder heads 151 are preferably machined to receive all required valve guides, rocker-arm bushings, valve seats, spark plug openings, etc. Heat rejection is preferably assisted by the inclusion of deep, closely spaced fins within the head casting, as shown.

Each cylinder head 151 is preferably joined to a respective cylinder barrel 152 using a threaded mating arrangement, as shown. In a preferred design advancement, indexed threading is used to precisely line up cylinder head 151 in a pre-determined position relative to the overall power-plant during assembly. The threads of cylinder head 151 and cylinder barrel 152 are indexed so that when cylinder head 151 is fitted to cylinder barrel 152, cylinder head 151 will reach the preferred torque specification at the same reproducible angular orientation relative to the output axis 144 of power-generation unit 150. This also preferably allows pre-drilling of the cylinder flange used to attach cylinder barrel 152 to crankcase assembly 186. Indexing is preferably achieved, in part, by the establishment of interference threading at the innermost threads.

Pistons 156 are preferably connected to the central crankshaft 210 by master rod assembly 153 and articulated rod assembly 154, as shown. In this preferred arrangement, one piston 156 of the nine radially-disposed pistons 156 is preferably coupled to master rod 158. Master rod 158 is directly attached to crankshaft 210 and the remaining eight pistons 156 are preferably coupled to master rod 158 by eight link rods 228 of articulated rod assembly 154.

Figure 9B:
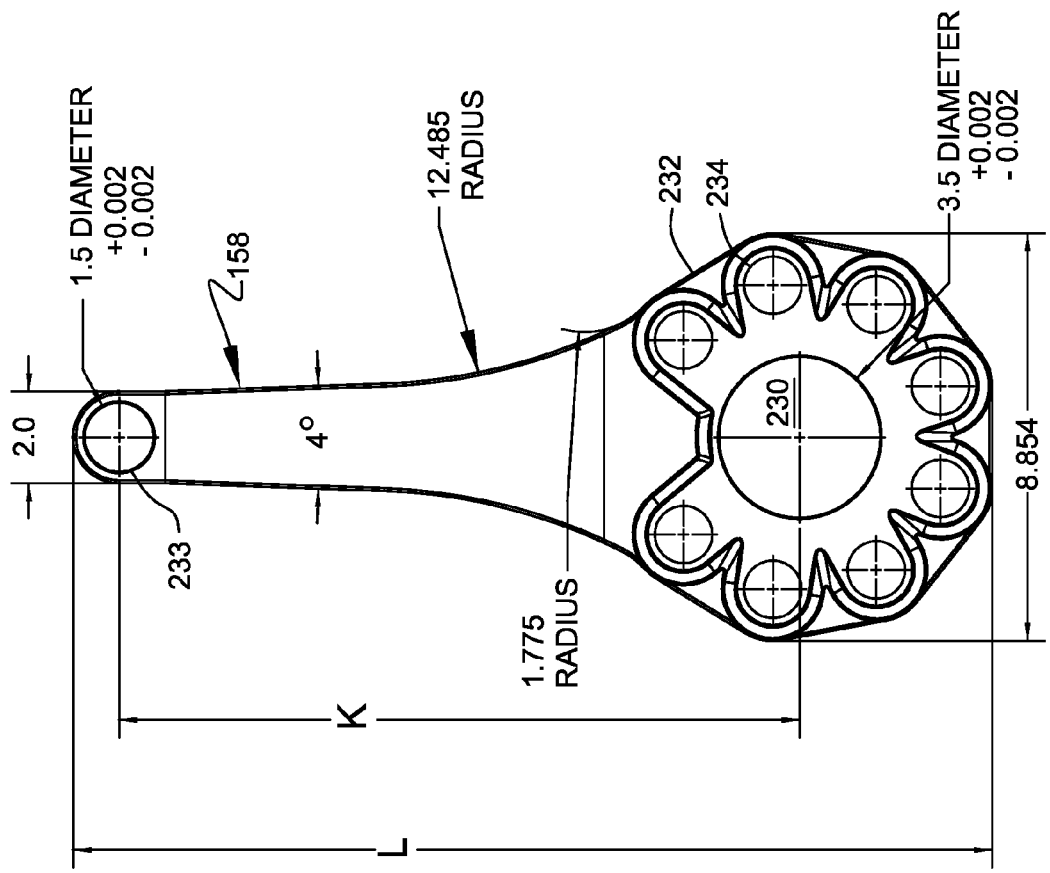
FIG. 9B shows front view of the preferred master rod of FIG. 9A.
Figure 9A:
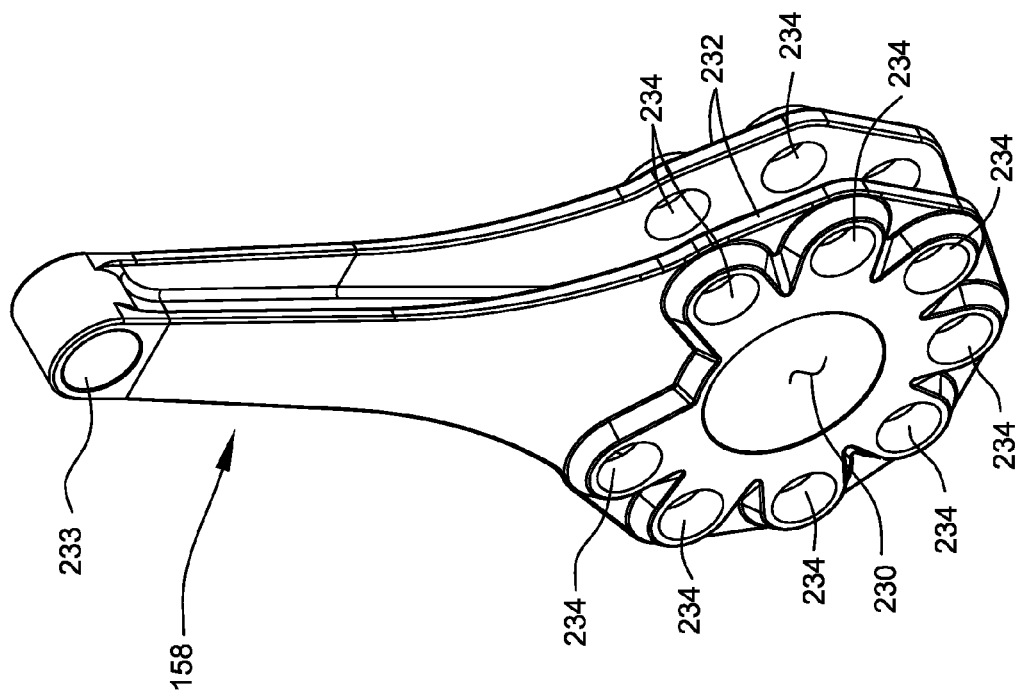
FIG. 9A shows a perspective view of a preferred master rod of the radial power plant of FIG. 7A, according to a preferred embodiment of the present invention.

FIG. 9A shows a perspective view of a preferred master rod 158 of radial power-generation unit 150, according to a preferred embodiment of the present invention. FIG. 9B shows a front view of master rod 158. FIG. 9C shows a side view of master rod 158. FIG. 9D shows the detail view 9D of FIG. 9B illustrating preferred arrangements of the "big end" of master rod 158. Reference is now made to FIG. 9A through 9D with continued reference to the prior figures. It is noted that miscellaneous mechanical fastener have been omitted from the illustrations to better depict the underlying structures. All dimensions shown in FIG. 9A through FIG. 9D are in inches unless noted otherwise.

As previously noted, a majority of components of radial power-generation unit 150 have been redesigned for improved durability, performance. As a chief example, the geometry of master rod 158 was significantly improved after analysis and testing by applicant produced a master-rod design exhibiting unexpected reductions in internal engine stresses with corresponding increases in engine durability. The preferred geometry of the master rod described herein not only allows the engine to operate with even compression and timing, but further enables a significant reduction in friction within components of the engine subjected to high wear.

Master rod 158 preferably comprises a single unitary metal forging, as shown, preferably comprising a heat-treatable alloy, most preferably 4340 alloy steel. The "big end" of master rod 158 preferably contains a main bearing bore 230 preferably adapted to house a master rod main bearing and crankpin 236 of crankshaft 210. Circumferential flanges 232 around the big end provides for the attachment of the eight articulated link rods 228. The preferred connection of each link rod 228 to master rod 158 is made using link pins 231 preferably engaged within link pin bores 234 of flanges 232.

Link-pin bores 234 of master rod 158 are preferably machined at the precise positions around the main-bearing bore 230 illustrated in FIG. 9D. Machining is preferably performed in an annealed or normalized/tempered condition. A full anneal is accomplished at about 1550 degrees Fahrenheit (F.) followed by controlled (furnace) cooling at a rate not faster than about 50 degrees F. per hour to a temperature of at least about 600 degrees F. Once annealed, machining may be performed by conventional methods having the required machine tolerances. Heat treatment for strengthening master rod 158 is preferably done per AISA, ASM, and or ASTM specifications.

In a preferred embodiment of master rod 158, each link-pin bore 234 is preferably spaced evenly by angular position but by not by radial position. The preferred radial position of each pin, as shown, is preferably adjusted to a preferred accuracy of about 5/10000 of an inch to ensure even compression ratios across all cylinders of the engine. It is noted that these preferred positions may preferably vary by as much as 120/1000 of an inch, as shown. The final dimension of each link-pin bore 234 is preferably precision honed.

In contrast to prior variants of the Curtis-Wright R-1820 engine, the preferred distance K between main bearing bore 230 and piston pin bore 233 has been increased to about 14.763 inches with preferred tolerances of +0.002 and −0.002. This preferred improvement requires a corresponding increase to the overall length L of master rod 158 equaling about 19.94 inches, as shown in FIG. 9B. Analysis by applicant determined that this improved rod length provides a reduction to the angle of the inherent back-and-forth rocking motion of master rod 158 during operation. The increased length also increases the moment arm applied to master rod 158, which functions to resists such rocking motion.

In contrast to all prior variants of the Curtis-Wright R-1820 engine, the center of gravity of master rod 158 has been shifted closer to main-bearing bore 230 so that the resistance of the main bearing to the rocking motion of master rod 158 is less severe due to a reduction of angular momentum about its moment of inertia. Applicant has determined that the combination of increased moment arm and decreased resistance due to momentum results in a significant reduction in friction between primary cylinder 238 and the respective piston 156 attached to master rod 158. The result is improved life of primary cylinder 238, decreased friction and wear for all link pins 231 and link rods 228 as well as a more evenly balanced engine stroke, which all contribute to significantly increased Time Between Overhauls (TBO).

It is noted that opposing surfaces 235 of master rod 158 are preferably machined flat and parallel, as shown. Faces 237 surrounding each link-pin bore 234 preferably comprise 35 degrees of draft, as shown.

Figure 9E:
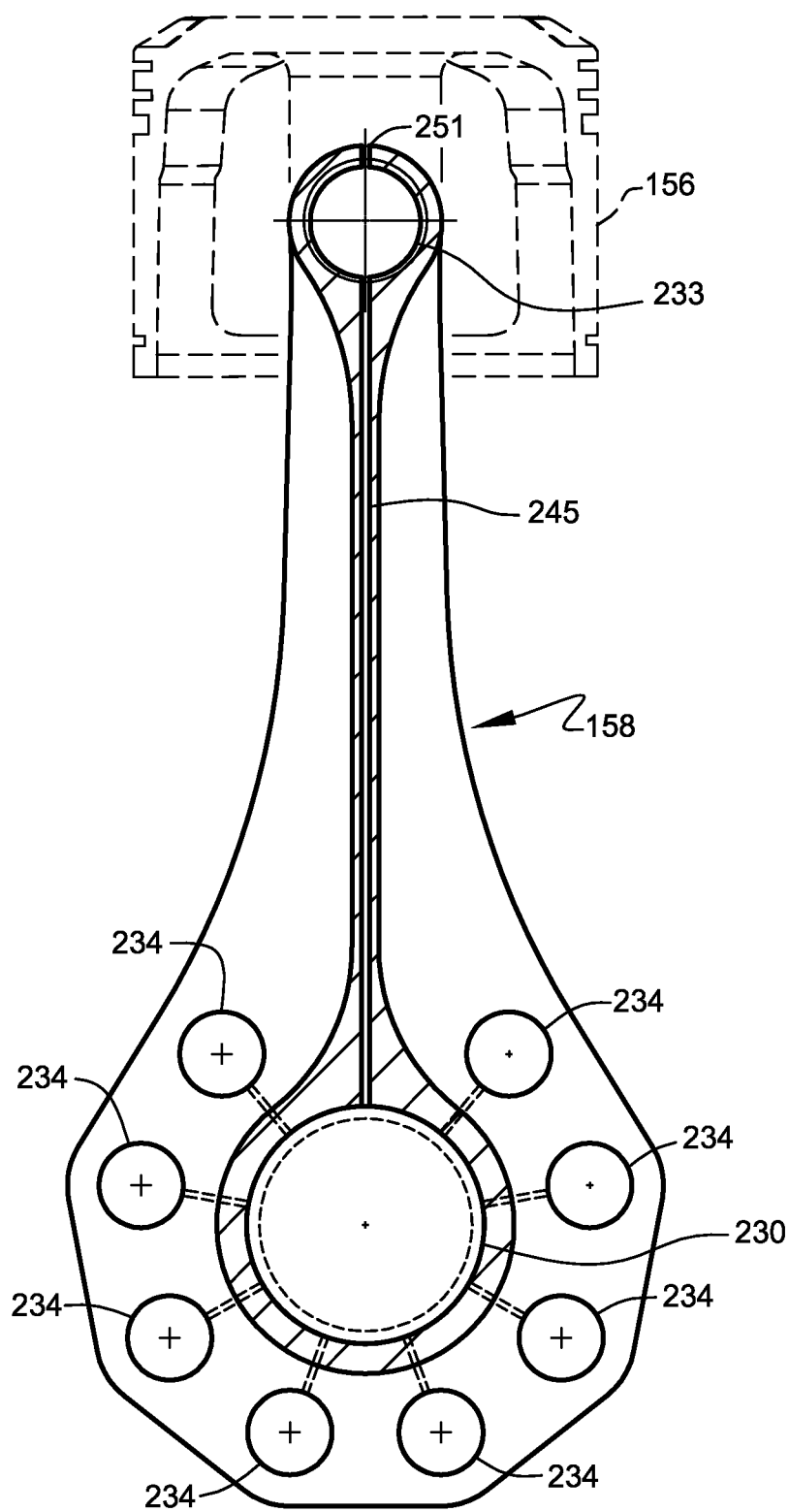
FIG. 9E shows a sectional view, through the section 9E-9E of FIG. 9C, illustrating a preferred internal oil flow passage extending through the longitudinal axis of the master rod of FIG. 9A.
Figure 9F:
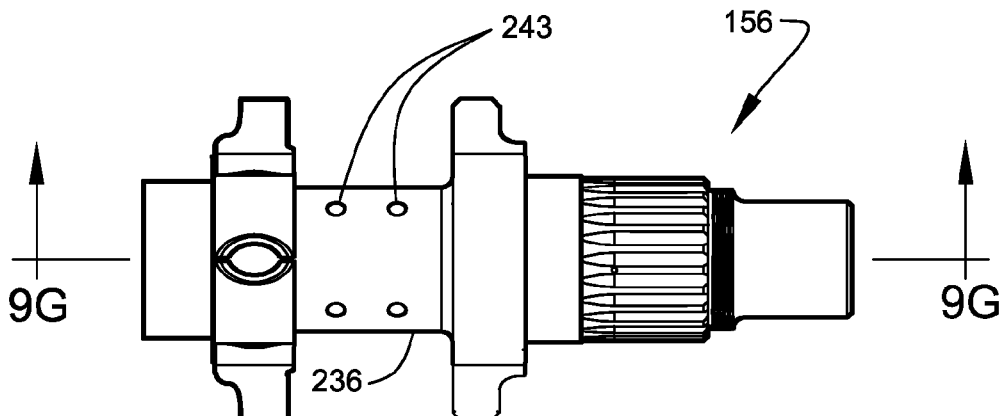
FIG. 9F shows a top view of a crankshaft of the radial power plant of FIG. 7A.
Figure 9G:
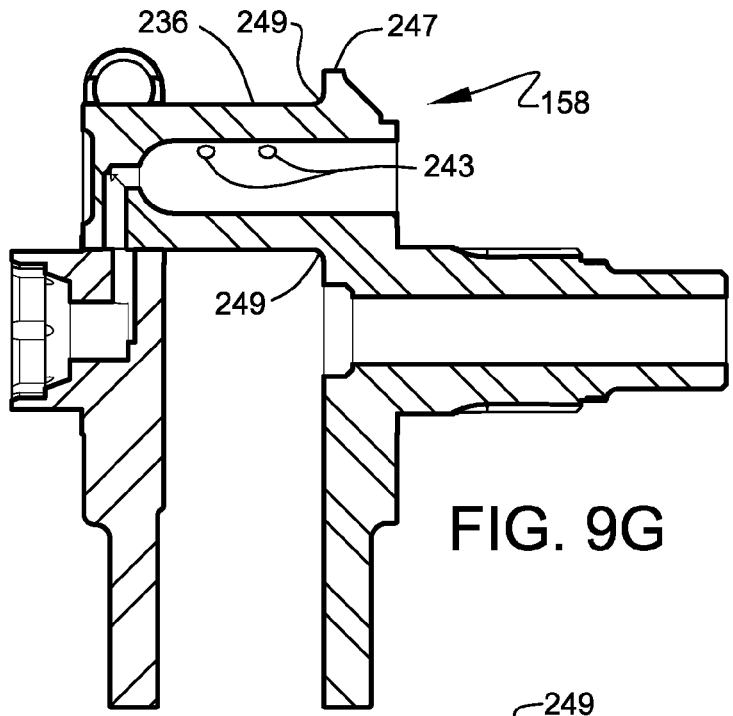
FIG. 9G is a sectional view through the section 9G-9G of FIG. 9F illustrating the internal oiling passages of the crankshaft of FIG. 9F.

FIG. 9E shows a sectional view, through the section 9E-9E of FIG. 9C, illustrating a preferred internal oil flow passage extending through the longitudinal axis of the master rod of FIG. 9A. FIG. 9F shows a top view of a crankshaft of the radial power plant of FIG. 7A. FIG. 9G is a sectional view through the section 9G-9G of FIG. 9F illustrating the internal oiling passages of the crankshaft of FIG. 9F.

Experimental testing indicated the need for additional thermal control within pistons 156 to achieve preferred durability levels require in the industrialized engine. This resulted in the development of an oil-cooled piston configuration wherein oil is preferably sprayed on the underside of the piston crown within the region of the piston skirt. In the preferred embodiment, crankpin 236 comprises a set of lubrication holes 243 communicating with the pressurized lubrication system of the engine. The lubrication holes 243 communicate cyclically with at least one passage formed in the big-end bearing and leading to a longitudinal oil passage 245 formed in the central web of master rod 158, as shown. Oil passage 245 is preferably in communication with oil discharge port 251 in the small end piston pin bore 233 of master rod 158, as shown. A stream of lubricating oil is preferably sprayed from discharge port 251 to the underside of the piston to dissipate heat.

Crankshaft 210 is preferably of a split-clamp type, as shown in FIG. 8D, thus allowing master rod 158 to comprise a preferred one-piece design, as shown. Preferably, the master rod assembly 153 and articulated rod assembly 154 are preferably assembled and then installed on crankpin 236; the subsections of crankshaft 210 are then joined together to form the primary rotating assembly of the power section. It is noted that edge transitions 239 preferably comprise a 0.0625 inch radius. Surface 241 preferably comprises a 0.125 inch radius, as shown. The journal surface of crankpin 236 is preferably induction hardened for strength and wear resistance. The preferred construction of crankshaft 210 prevents the entire journal surface to be induction hardened; specifically, the fillet transition region 249, between crank pin 236 and the adjacent counterbalance 247, is inaccessible to conventional induction hardening apparatus. Applicant has determined that material fatigue at the weaker fillet transition region 249 is a dominant mechanism of failure within this type of crankshaft. To provide consistent hardening across the entire length of crankpin 236, it is preferred that each fillet transition region be work hardened using a high-pressure mechanical roller. In a preferred procedure, the fillet transition region 249 is cold-worked by the mechanical roller. The resulting plastic deformation of the metal effectively increases the fatigue strength of the material, to more closely match the material properties of the induction hardened region of the crankshaft.

Figures 8E, 8F:
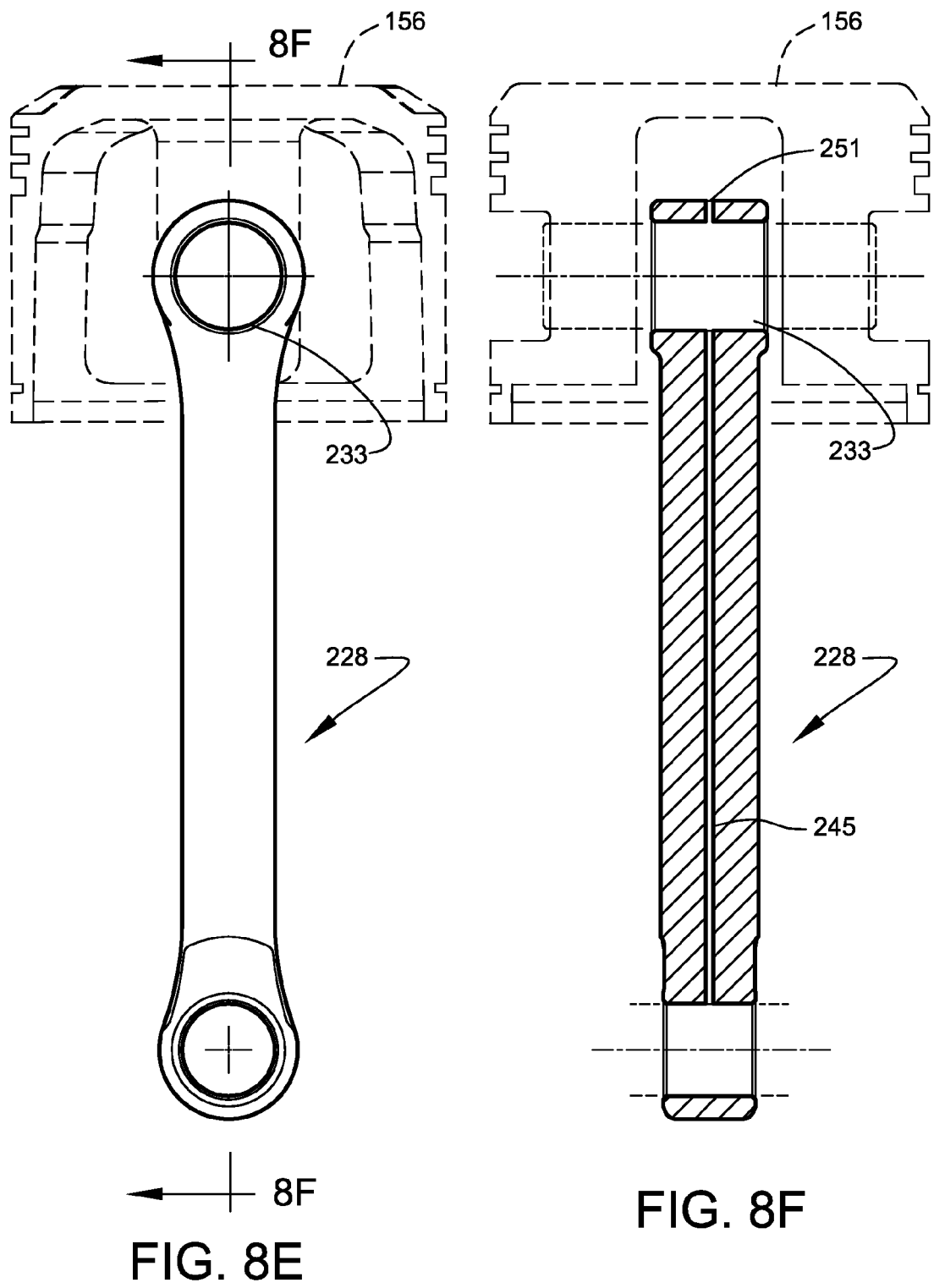
FIG. 8E shows a side view of a link rod of the radial power plant of FIG. 7A.
FIG. 8F shows the longitudinal sectional view 8F-8F of FIG. 8E illustrating a preferred internal oil flow passage extending through the longitudinal axis of the link rod.

FIG. 8E shows a side view of a link rod of the radial power plant of FIG. 7A. FIG. 8F shows the longitudinal sectional view 8F-8F of FIG. 8E illustrating a preferred internal oil flow passage extending through the longitudinal axis of the link rod. As with master rod 158, each link rod 228 preferably comprises a longitudinal oil passage 245 to deliver lubricating oil to the underside of the respective pistons 156. In the preferred embodiment, each link-pin bore 234 comprises at least one lubrication channel communicating with the pressurized lubrication system of the engine via the main-bearing bore 230. At least one passage formed in the link bearing preferably leads to the longitudinal oil passage 245 formed in link rod 228, as shown. Oil passage 245 is preferably in communication with oil discharge port 251 in the small end piston pin bore 233 of link rod 228, as shown. A stream of lubricating oil is preferably sprayed from discharge port 251 to the underside of the piston to dissipate heat.

Figure 9H:
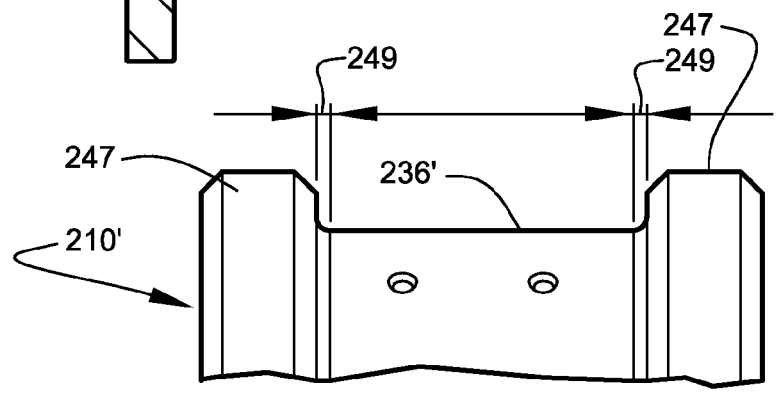
FIG. 9H is a partial side view, illustrating preparation of a crank pin of an alternate crankshaft, according to another preferred embodiment of the present invention.

FIG. 9H is a partial side view, illustrating the crank pin of an alternate crankshaft 210', according to another preferred embodiment of the present invention. In alternate preferred embodiments of radial power-generation unit 150, crankshaft 210' preferably comprises a solid unit supporting an alternate master rod of a split-type configuration (see for example, the Pratt & Whitney model R-4360 radial engine). In this alternate preferred configuration, crankpin 236' is integrally formed with the adjacent web of each counterbalance 247, as shown.

The unitary construction of alternate crankshaft 210' prevents the entire journal surface to be induction hardened; specifically, the two fillet transition regions 249, between crank pin 236' and the adjacent counterbalances 247, are inaccessible to conventional induction hardening apparatus. To provide consistent hardening across the entire length of crankpin 236', it is preferred that each fillet transition region be work hardened using the above-noted high-pressure mechanical roller. In a preferred procedure, each fillet transition region 249 is cold-worked by the mechanical roller to effectively increase the fatigue strength of the material.

Figure 10A:
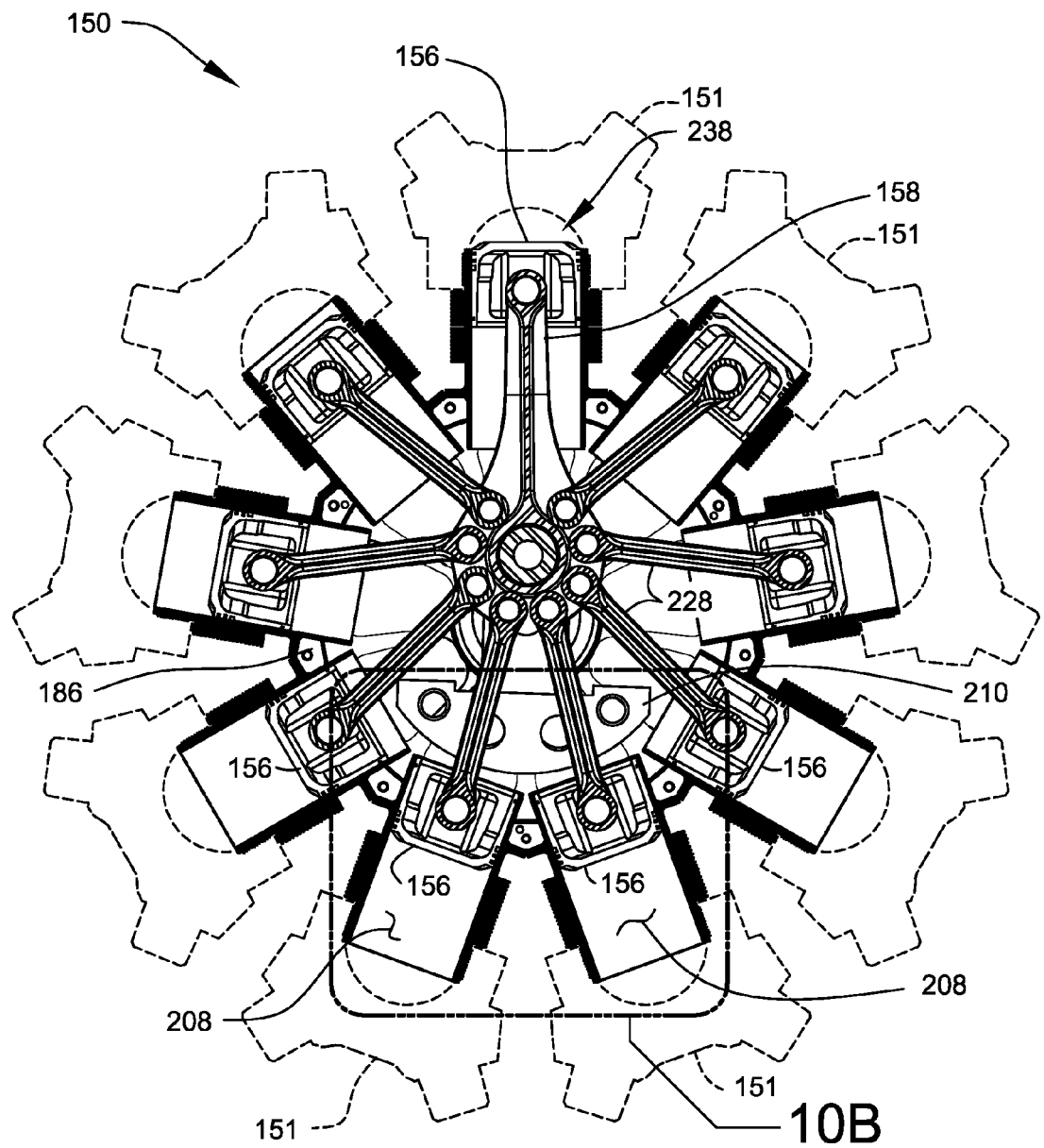
FIG. 10A shows a sectional view through the transverse section 10A-10A of FIG. 8A illustrating the principal rotating components of the radial power plant of FIG. 7A.

FIG. 10A shows a sectional view through the transverse section 10A-10A of FIG. 8A illustrating the principal rotating components of the radial power plant of FIG. 7A.

Figure 10C:
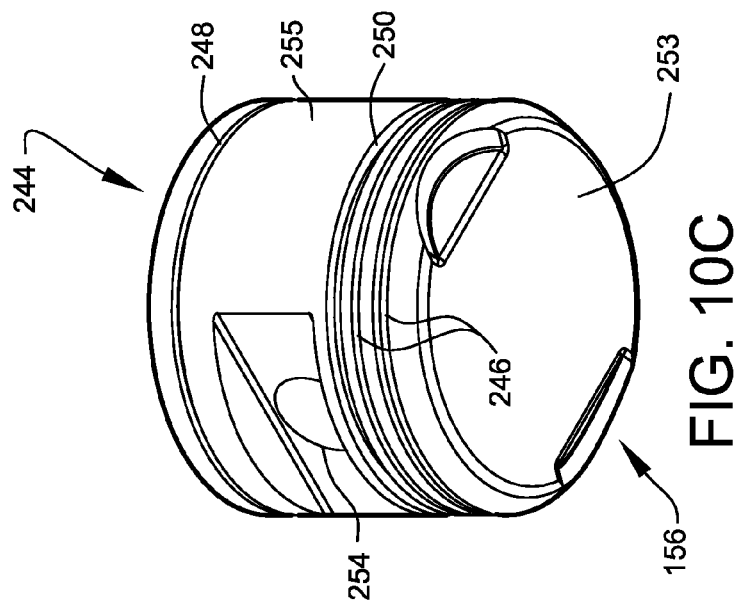
FIG. 10C is a perspective view of illustrating a preferred piston arrangement, according to a preferred embodiment of the present invention.
Figure 10B:
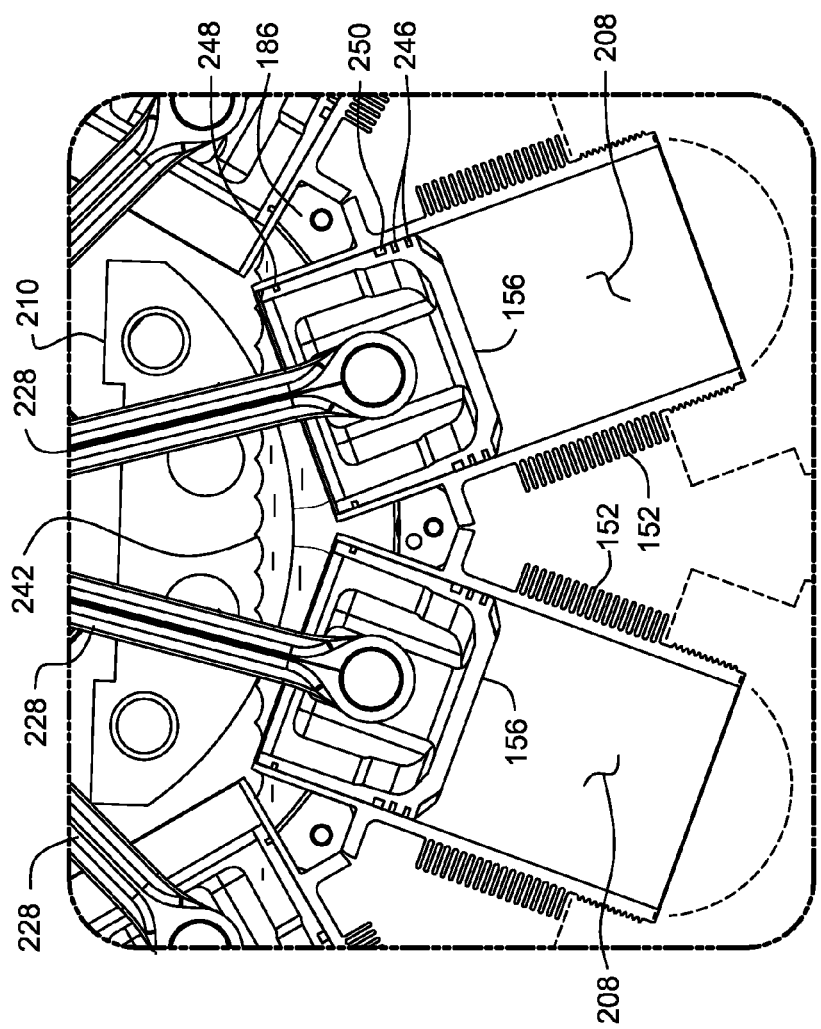
FIG. 10B shows the detail sectional view 10B of FIG. 10A illustrating the lower pistons and cylinders of the radial power plant of FIG. 7A.
Figure 10E:
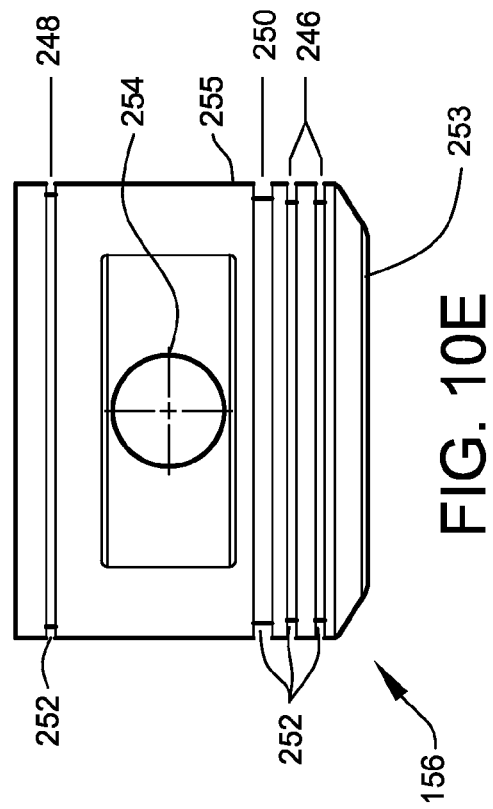
FIG. 10E is a second side view illustrating the piston of FIG. 10C.
Figure 10D:
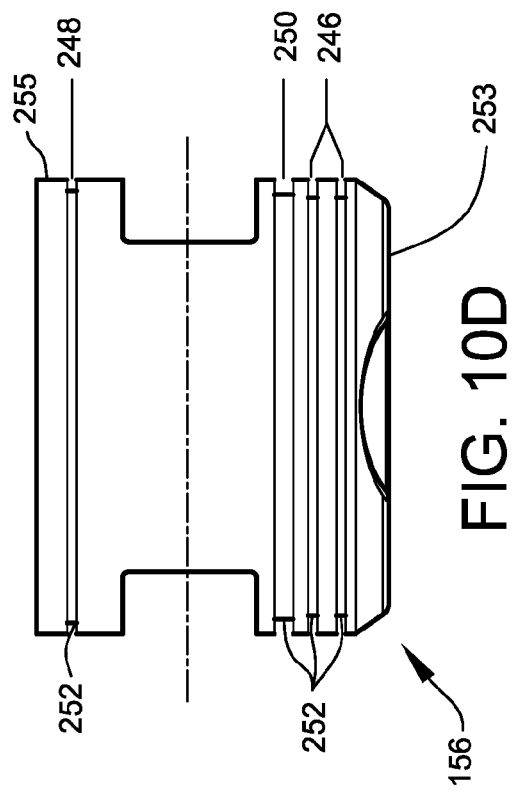
FIG. 10D is a first side view illustrating the piston of FIG. 10C.

FIG. 10A shows a sectional view through the transverse section 10A-10A of FIG. 8A illustrating the principal rotating components of radial power-generation unit 150. FIG. 10B shows the detail sectional view 10B of FIG. 10A illustrating the lower pistons 156 and cylinder barrels 152 of radial power-generation unit 150. FIG. 10C is a bottom perspective view of illustrating a single piston 156 comprising a preferred piston-ring arrangement, according to a preferred embodiment of the present invention. FIG. 10D is a first side view illustrating the piston 156 of FIG. 10C. FIG. 10E is a second side view illustrating piston 156 of FIG. 10C.

Often, dry-sump oil scavenging is incomplete after engine shutdown, leaving a quantity of oil 242 in the bottom of the crankcase. Conventional radial engines are generally prone to oil migration into combustion chambers 208 of the lowest cylinders 149 by gravitational movement of this oil 242 past the sealing rings 240 of piston 156. This condition is problematic to operation of generator set 102 for several reasons. First, the presence of oil 242 within one or more combustion chambers 208 has the potential of creating a "liquid lock" condition wherein engine damage can occur during startup as excessive forces are generated as the lower pistons move against the non-compressible oil within the combustion chamber.

Secondarily, smaller quantities of oil 242, while not affecting the startup, produce unacceptable levels of hydrocarbon emissions during startup (blue smoke) or manifest as oil droplets expelled into the exhaust assembly and downstream turbochargers 160 and exhaust silencers 124 (e.g. a wet start).

Radial power-generation unit 150 preferably comprises an improved piston-sealing assembly 244 adapted to prevent such migration of oil past the piston, while maintaining sufficient cylinder lubrication during operation.

Pistons 156 are preferably formed from at least one high-temperature aluminum alloy using a three-stage cold forged process. The crowns 253 of pistons 156 are preferably hard anodized. The piston skirts 255 are preferably bonded with at least one hard metallic coating, preferably an intermetallic compound, preferably a molybdenum-disilicide (MoSi2) deposition.

Grooves 252 are preferably formed in the outside surface of pistons 156 to receive the piston rings, as shown. The improved piston sealing assembly 244 preferably comprises two compression rings 246 of conventional design, a set of three oil control rings 250, and a set of three oil scraper rings 248 to assist in controlling oil migration past the piston skirt. The compression rings 246 are preferably installed in the two grooves closest to crown 253 of piston 156; the three oil control rings are preferably installed in the next groove adjacent piston pin 254, as shown. The set of three oil scraper rings 248 are preferably installed in the final grove located at the lower end of piston 156. It is this preferred combination of rings that limits excessive oil migration into the lower combustion chamber 208.

Radial power-generation unit 150 preferably comprises a displacement of at least about 1,800 cubic inches, more preferably a displacement of about 1,820 cubic inches. Radial power-generation unit 150 preferably comprises a cylinder bore of about 6.125 inches, a stroke of about 6.875 inches, and a compression ratio of about nine to one. Upon reading this specification, those with ordinary skill in the art will now appreciate that, under appropriate circumstances, considering such issues as advances in material technology, heat dissipation, engine control, etc., other engine arrangements such as, for example, development of smaller-displacement high-compression units, etc., may suffice.

Additional engine components, visible in FIG. 8B, preferably include PTO final drive half shaft 282, PTO bearing carrier 284, forward gearbox assembly 286, oil pumps 172, rocker-arm covers 292, and accessory power take off 294 (preferably used to drive an electrical alternator).

Figure 11:
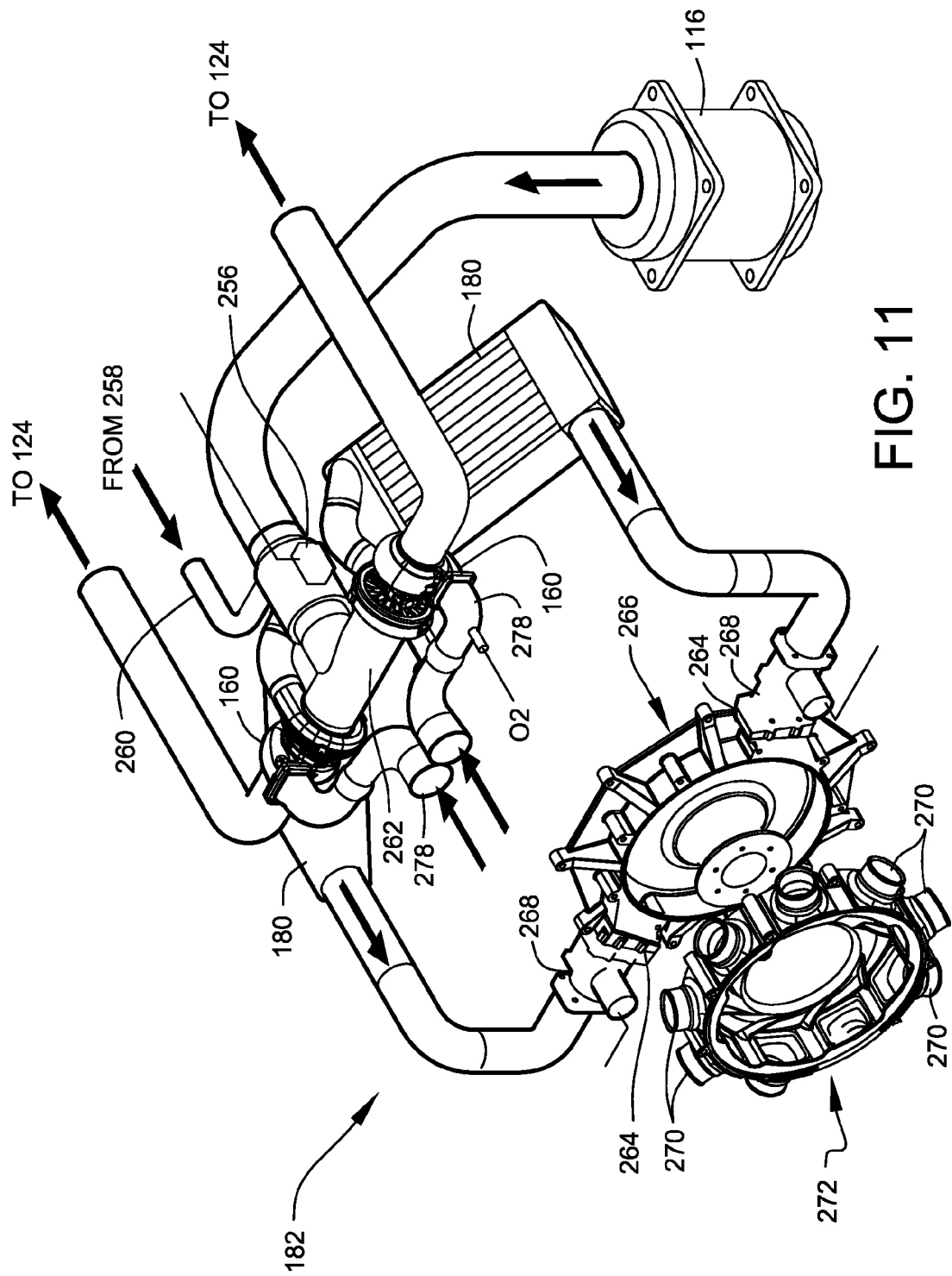
FIG. 11 shows an isolated perspective view, generally illustrating a preferred induction arrangement of the radial power plant of FIG. 7A, according to a preferred embodiment of the present invention.

FIG. 11 shows an isolated perspective view, generally illustrating the preferred engine-induction assembly 182 (at least embodying herein at least one induction pathway) of radial power-generation unit 150, according to a preferred embodiment of the present invention. An important feature of radial power-generation unit 150 is the flexible adaptability of the system to a range of fuels, such as, for example, natural gas, methane, alcohol, gasoline, propane, etc. A highly preferred embodiment of engine-induction assembly 182 is preferably configured to utilizing natural gas, as described below.

Engine-induction assembly 182 preferably comprises a forced-induction system, preferably comprising dual exhaust-gas turbochargers 160, as shown. In a preferred embodiment of engine-induction assembly 182, combustion air is routed through air cleaner 116 to a variable Venturi-type gas-air mixer 256, as shown. Gas-air mixer 256 is preferably adapted to receive a flow of natural gas routed from gas train 258 of fuel-delivery components 122 (see FIG. 1) through gas supply line 260, as shown.

Gas-air mixer 256 preferably produces a stoichiometric mixture of air and fuel by a metered mixing of the natural gas with the incoming flow of combustion air. The resulting air/fuel mixture exits gas-air mixer 256 into a bifurcated transfer tube 262 functioning to dividing the air/fuel mixture between the compressor inlets of the turbochargers 160. Each turbocharger 160 compresses (boosts) the incoming air/fuel mixture, from ambient pressure to an appropriate delivery pressure, preferably in the range of about 12 to 16 pounds per square inch (psi).

After compression by a respective turbocharger 160, the air/fuel mixture preferably passes through at least one heat exchanger used to control the temperature of the air/fuel mixture exiting the turbocharger. Engine-induction assembly 182 preferably comprises a pair of air-to-air intercoolers 180 where the increased temperature of the compressed air/fuel mixture is reduced. From intercooler 180 the air/fuel mixture is delivered to one of the two intake ports 264 of intake cover 266, preferably by passing through one of two butterfly-type governors 268 functioning to maintain radial power-generation unit 150 at a preferred operational speed of about 2200 RPM. From intake cover 266 the air/fuel mixture is preferably distributed to the nine exit ports 270 of intake manifold 272. Nine intake tubes 274 (see FIG. preferably transfer the air/fuel mixture to the intake ports of cylinder heads 151.

Turbochargers 160 are preferably driven by the exhaust gases discharged through the starboard and port exhaust manifolds 276, as shown. The turbine inlet of each turbocharger 160 is preferably coupled to a respective exhaust manifold 276 by a flanged exhaust tube 278, as shown. Exhaust exiting turbochargers 160 is preferably routed to exhaust silencers 124, as shown.

Each turbocharger 160 is preferably selected from the GT47 model series produced by Honeywell Garrett. Each turbocharger 160 preferably comprises an oil-cooled bearing system. Upon reading this specification, those with ordinary skill in the art will now appreciate that, under appropriate circumstances, considering such issues as cost, performance requirements, etc., other forced induction arrangements such as, for example, adding pressure-controlling wastegates, anti-detonation water injection, using a single large turbocharger, utilizing a supercharger, etc., may suffice.

Gas-air mixer 256 preferably comprises a VARIFUEL2 gas-air mixer produced by Motortech GmbH of Celle, Germany. The VARIFUEL2 unit is preferred, in part, for its inherent capability to regulate many different gases and gas qualities (including bio gas). Gas-air mixer 256 preferably comprises a stepper motor for active onboard by control system 120. Each butterfly-type governor 268 preferably comprises a remotely-actuated WOODWARD brand throttle valve produced by the Woodward Co. of Fort Collins, Colo. Actuation of butterfly-type governor 268 is preferably controlled by the onboard control system 120 to maintain the output of the power plant under various demand loads.

Figure 12:
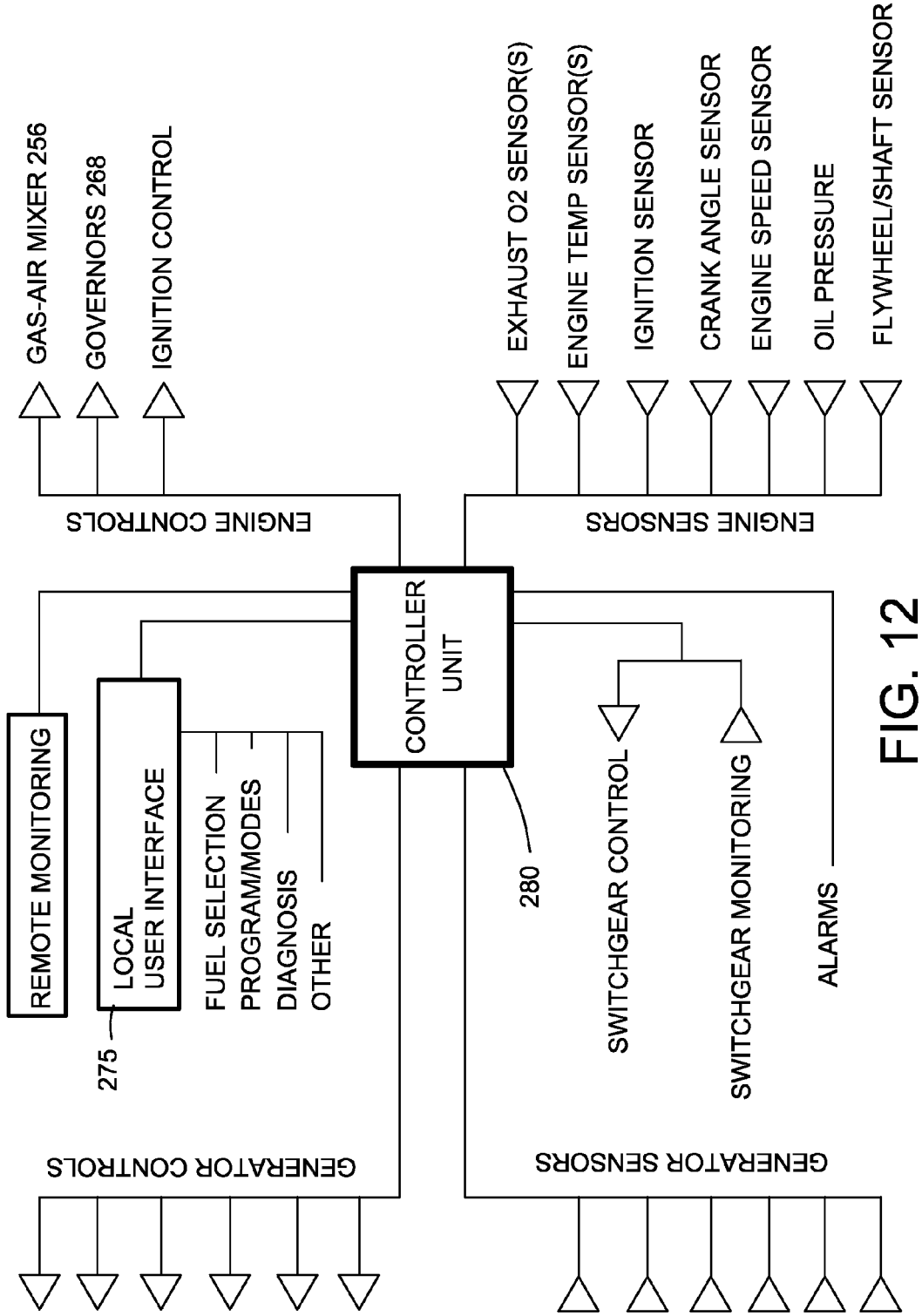
FIG. 12 shows a diagram generally illustrating a preferred controls arrangement of the mobile generator set of FIG. 1, according to a preferred embodiment of the present invention.

FIG. 12 shows a diagram generally illustrating a preferred controls arrangement of mobile generator set 102 of FIG. 1, according to a preferred embodiment of the present invention. Engine control is preferably provided buy an onboard microprocessor-based control system 120. Preferred control systems 120 include one or more commercially available controller 280, preferably a COMAP model IS NT produced by ComAp, spol. s r. o. of Prague, Czech Republic. The preferred A10 controller preferably includes eight on-board digital input/output ports and four analog input/output ports. Data is preferably displayed on local user interface 275, preferably comprising a panel screen accessed at the rear of outer housing 106. The housing of control system 120 is preferably sealed for environmental protection (preferably to the IP65 standards), allowing control systems 120 to be installed within the switchgear cabinet of outer housing 106. Control features include universal Proportional-Integral-Derivative PID loops, control of air fuel ratio, support for electronic engine control units, automatic synchronizing and power control, peak shaving, interrupt-free reverse synchronizing, voltage and power factor PF control, active load sharing (in a multi-gen-set mode), and baseload import and export.

Monitoring and diagnosis features of controller 280 preferably include voltage regulation, network protection, PLC control of pumps and fans, display of operating data, and alarms. Engine protection may preferably comprise monitoring of oil pressure, temperature, ignition/anti-knock control, and misfire detection, output control, air fuel mixture control, synchronization, power factor (Cos-PHI) monitoring, and varistor monitoring. Generator measurements may preferably comprise voltage (U), current (I), frequency (Hz), power (kW), reactive power (kvar), apparent power (kVA), power factor (PF), kW hours (kWh) and reactive power hours (kVAh), and mains measurements U, I, and Hz.

Controller 280 is preferably adapted to interface with at least one standard network protocol, preferably supporting analog/GSM/ISDN communications. This allows for control, monitoring, and diagnosis of mobile generator set 102 by remote technicians having appropriate network access. An additional safety features may preferably comprise a Short Message Service (SMS) alarm feature adapted to transmit an alert to a designated mobile telephone should mobile generator set 102 experience one or more off-specification events. Controller 280 is further capable of data logging allowing operational data to be stored for later collection and analysis.

In a preferred arrangement of control systems 120, controller 280 is preferably aligned to interoperate with butterfly-type governor 268, Gas-air mixer 256, a Woodward model 2301A speed controller, a model ZFAS-U1 exhaust gas oxygen sensor (lamba sensor) unit by NGK Spark Plug Europe GmbH, a secondary WEGO wide-band air/fuel ratio (AFR) monitor (preferably coupled with one or more Bosch model LSU wide-band oxygen sensors), a model MIC750 ignition control unit, a CompAp model IS-AIN8 analog input module, a plurality of electrical-control relays, fuse blocks, signal conditioning devices, isolation and interconnecting hardware, and power supplies serving the electronics of control systems 120.

The exhaust gas oxygen sensors are preferably located in flanged exhaust tube 278. Other sensors (crank angle, temperature sensors, etc.) are preferably located in accordance with the recommendations of the component's respective manufacturer.

Gas train 258 supplying the natural-gas fuel preferably comprises a Gas Control Measurement and Safety System (GRMS), preferably comprising a pressure regulation portion, a volume flow measurement portion, and at least one automatic shut-off valve to terminate gas flow under off-specification conditions. Gas train 258 is preferably selected from products produced by Dungs Combustion Controls of Urbach Germany. Upon reading this specification, those with ordinary skill in the art will now appreciate that, under appropriate circumstances, considering such issues as fuel cost, fuel availability, environmental restrictions, etc., other fuel arrangements such as, for example, the use of switchable bi-fuel systems (natural gas and gasoline), tri-fuel systems (low-pressure propane, natural gas, gasoline), mixers to blend bio fuels with natural gas, etc., may suffice.

Mobile generator set 102 produces significantly less pollution than equivalent diesel gensets. Using natural gas or propane and as a fuel source, mobile generator set 102 is capable of meeting U.S. Environmental Protection Agency (EPA)/California Air Resources Board (CARB) requirements for Tier 4 emission certification (preferably utilizing a catalytic exhaust path). Preferred embodiments of mobile generator set 102 may preferably comprise alternate preferred features, to increase overall energy efficiency of the system, such as, for example, exhaust gas heat recovery apparatus, combined heat and power system (CHP), etc.

Figure 13A:
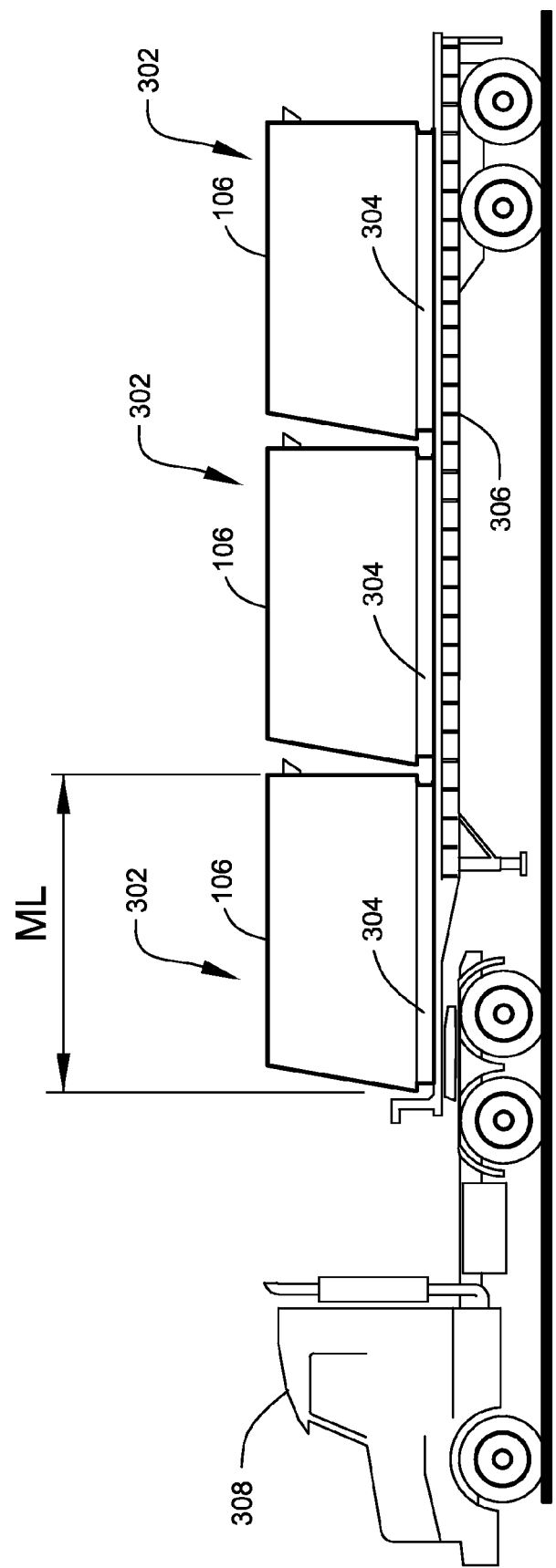
FIG. 13A shows a diagram generally illustrating the transport of a plurality of lightweight and compact mobile generator sets, each one capable of producing about 1 Megawatt of electrical power, according to a preferred method of the present invention.

FIG. 13A shows a diagram generally illustrating the transport of a plurality of skid-mounted mobile generator sets 302, each one capable of producing about 1 Megawatt of emergency electrical power, according to preferred method 300 of the present invention. As with mobile generator set 102, skid-mounted mobile generator set 302 is preferably capable of providing emergency, standby, peak shaving, and continuous electrical power to a wide range of electrically-dependent operations. Conventional one-megawatt diesel or natural gas-powered mobile generator sets are large, heavy, and require a tractor-trailer rig for each unit being transported. The preferred power density of mobile generator set 102 allows multiple megawatts to be transported by the same towing vehicle.

The preferred construction of skid-mounted mobile generator set 302 is substantially similar to that of mobile generator set 102, as described above, except for the substitution of a skid-type base 304 in lieu of towable trailer chassis 104, as shown. In terms of physical size and internal volume, both skid-mounted mobile generator set 302 and mobile generator set 102 share a substantially similar, and in many cases, an identical outer housing 106.

Including towable trailer chassis 104, a one-megawatt mobile generator set 102 comprises a maximum system weight of less than about 7,711 kilograms (17,000) pounds, most preferably less than about 5,443 kilograms (12,000 pounds). A one-megawatt skid-mounted mobile generator set 302 preferably comprises a maximum weight of less than about 5,900 kilograms (13,000 pounds), most preferably less than about 4,763 kilograms (10,500 pounds).

Both mobile generator set 102 and skid-mounted mobile generator set 302 are preferably capable of generating about 750 kilowatts of continuous power, 900 kilowatts of prime power, and 1,000 kilowatts of emergency power. Thus, a "ready-to-run" skid-mounted mobile generator set 302 preferably comprises a preferred peak electrical output-to-system-weight ratio, excluding operating fuel, of about 0.17 kilowatts per kilogram.

Outer housing 106 preferably comprises an enclosed internal volume 128 of less than about 24 cubic meters (850 cubic feet). Thus, both skid-mounted mobile generator set 302 and mobile generator set 102 comprise a preferred electrical output to enclosed housing volume of about 41.5 kilowatt per cubic meter.

Because outer housing 106 comprises a preferred maximum length ML that does not exceed about 4 meters (160 inches), at least three skid-mounted mobile generator sets 302 can be transported on a single conventional flatbed trailer 306, pulled by a conventional semi-type towing tractor 308, in legal conformance with U.S. DOT regulations for over road transport. The exceptional power density of the preferred embodiments of portable energy generation system 100 allows for the efficient transport and delivery of large capacity emergency electrical power in times of need. Alternately preferably, skid-mounted mobile generator set 302 may be containerized within a standard intermodal-transport shipping-container 550, as shown in FIG. 15.

Figure 13B:
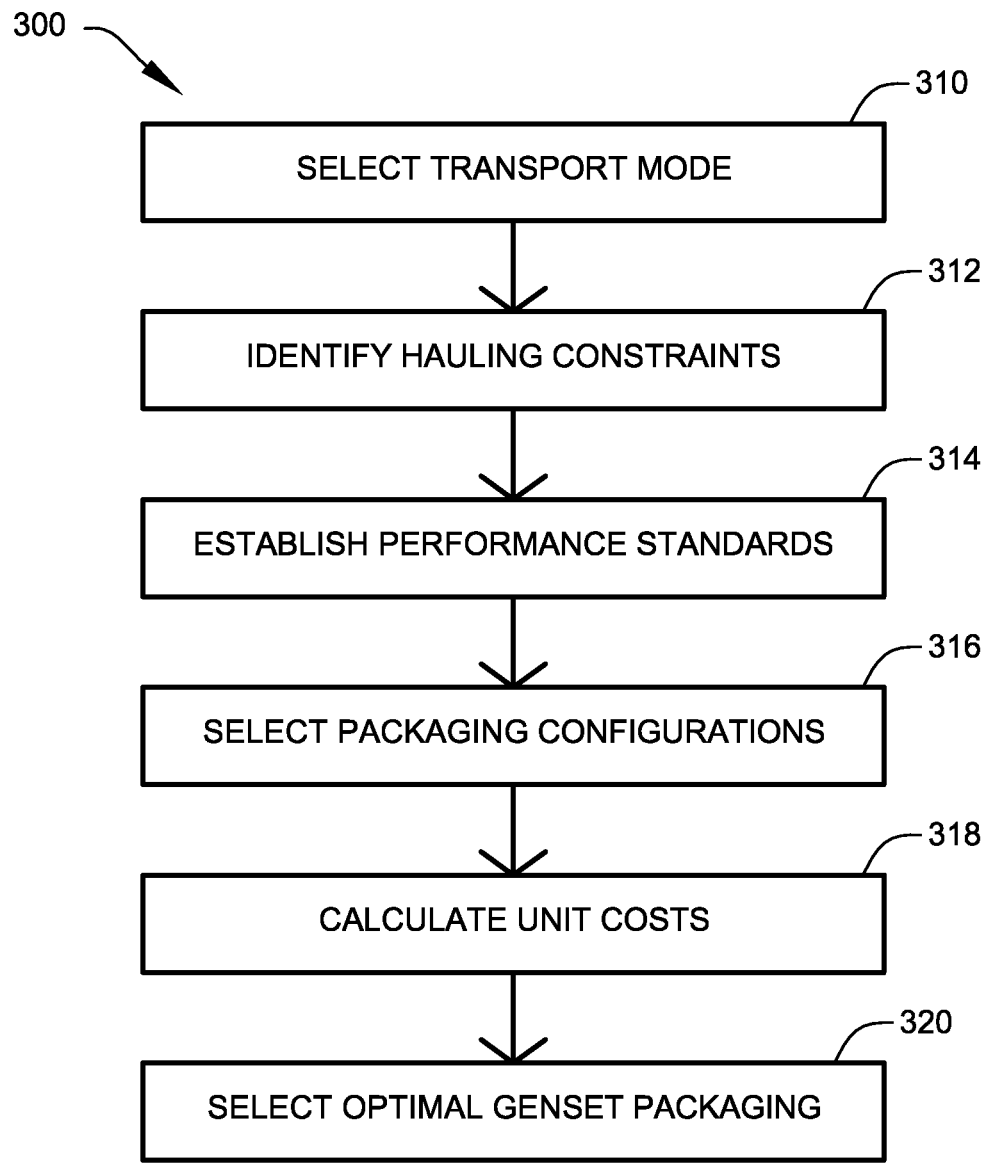
FIG. 13B is a flow diagram generally illustrating the preferred steps of a preferred method of the present invention.

FIG. 13B is a flow diagram generally illustrating the preferred steps of method 300 of the present invention. Method 300 is preferably related to reducing vehicular transportation costs associated with the transport of preferred embodiments of portable energy generation system 100, preferably including skid-mounted mobile generator set 302. In the initial preferred step 310 of method 300, a transport mode is selected to physically transport skid-mounted mobile generator set 302. This may preferably comprise, for example, a road-going tractor-trailer rig, as shown, a rail car, a shipping container, a nautical vessel, a transport aircraft, etc. Next, at least one set of hauling-capacity constraints associated with a maximum hauling capacity of the selected transport mode is identified in preferred step 312. This may comprise identifying maximum hauling lengths, widths, weight capacities for the selected transport mode. Next, as indicated in preferred step 314, at least one set of minimum performance parameters is preferably established for skid-mounted mobile generator set 302. For example, skid-mounted mobile generator set 302 may require an output of one megawatt, using ethanol fuel, with exhaust silencers 124 and outer panels 126 providing a maximum sound output of less than 75 decibels at 7 meters.

In preferred step 314, at least one set of possible physical configurations for the enclosure of outer housing 106 is developed. Each developed configuration is preferably capable of packaging a fully functional and essentially ready-to-run engine-generator arrangement meeting the minimum selected performance parameters. In the next preferred step 316, at least one transport-compliant set of physical packaging configurations is preferably selected from the set of possible physical packaging configurations developed in step 314. Each selection of step 316 preferably falls substantially within the previously identified hauling-capacity constraints of step 312.

Next, as indicated in preferred step 318, unit production costs associated with each of the selected transport-compliant set of physical packaging configurations are calculated. Based on the results of the calculations of step 318, at least one physical packaging configuration for outer housing 106 is preferably selected in the preferred step 320. The physical packaging configuration selection of step 320 must preferably fall within an acceptable unit production cost goal for the overall embodiment. In the preferred embodiments of portable energy generation system 100 derived from method 300, at least one minimum performance parameter of step 314 preferably a minimum peak electrical output of about one megawatt.

Figure 14A:
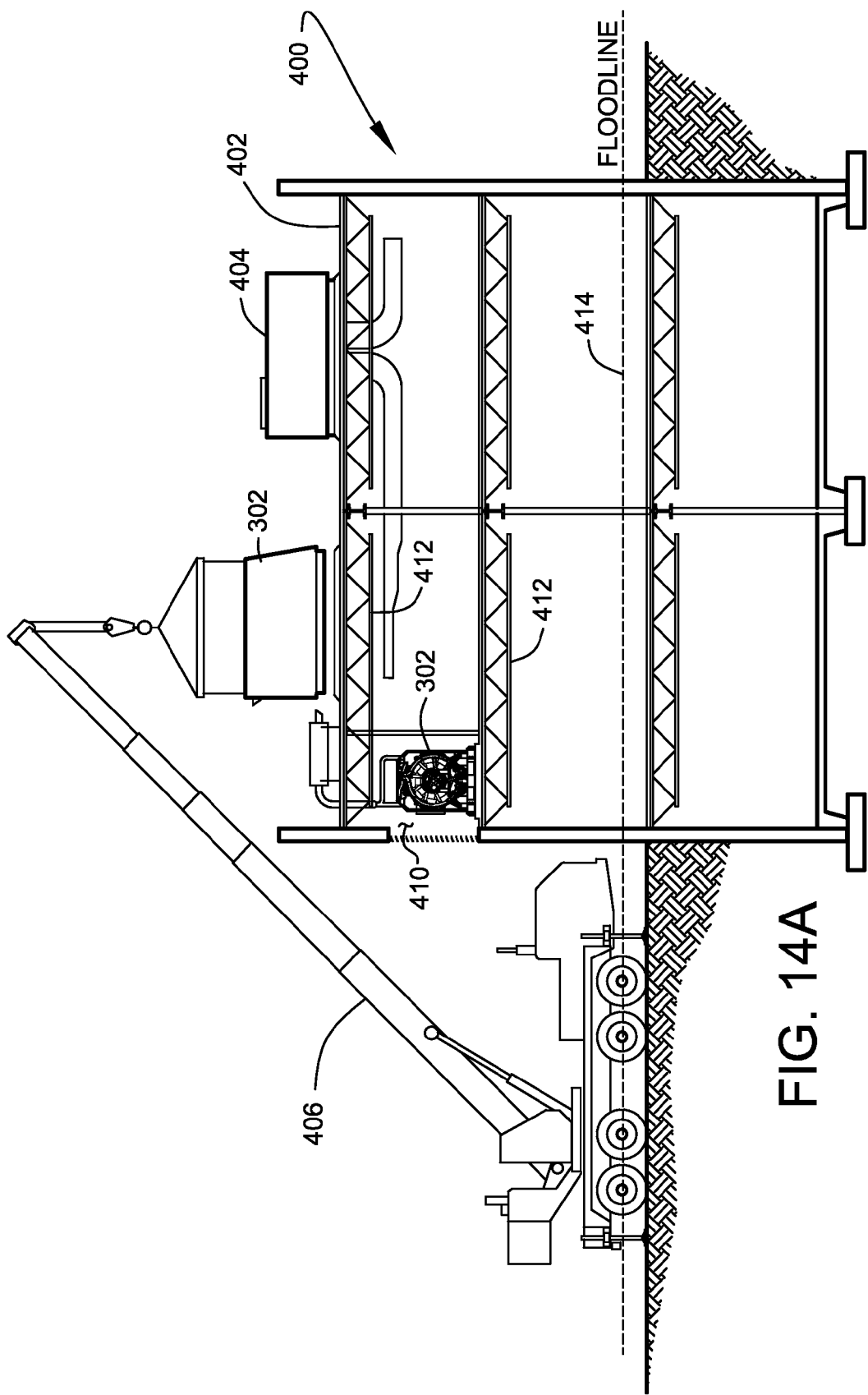
FIG. 14A shows a sectional diagram, generally illustrating the placement of compact mobile generator sets within a building structure, according to another preferred embodiment of the present invention.

FIG. 14A shows a sectional diagram, generally illustrating the stationary placement of skid-mounted mobile generator set 302 within building structure 400, according to another preferred embodiment of the present invention. The extremely compact and lightweight configuration of preferred embodiments of the present invention allows the placement of units within building structures that would otherwise not accommodate generator sets of equivalent capacity. This preferably includes the ability to support skid-mounted mobile generator set 302 on roof 402 of building structure 400, in a manner substantially similar to standard package-type Heating Ventilation and Cooling (HVAC) units 404. The compact and lightweight configuration of skid-mounted mobile generator set 302 enables such placement by small mobile crane 406, such as used in standard HVAC construction, and allows for the transport of skid-mounted mobile generator sets 302 to remote locations by helicopters of moderate lift capacity.

With outer housing 106 removed, skid-mounted mobile generator set 302 of portable energy generation system 100 may be located in a relatively small interior space 410 of building structure 400, as shown. The low weight of skid-mounted mobile generator set 302 allows the unit to be placed with minimum impact to the building support structure 412. Thus, skid-mounted mobile generator set 302 can be placed on upper-level floors, for example, above flood line 414, as shown.

Figure 14B:
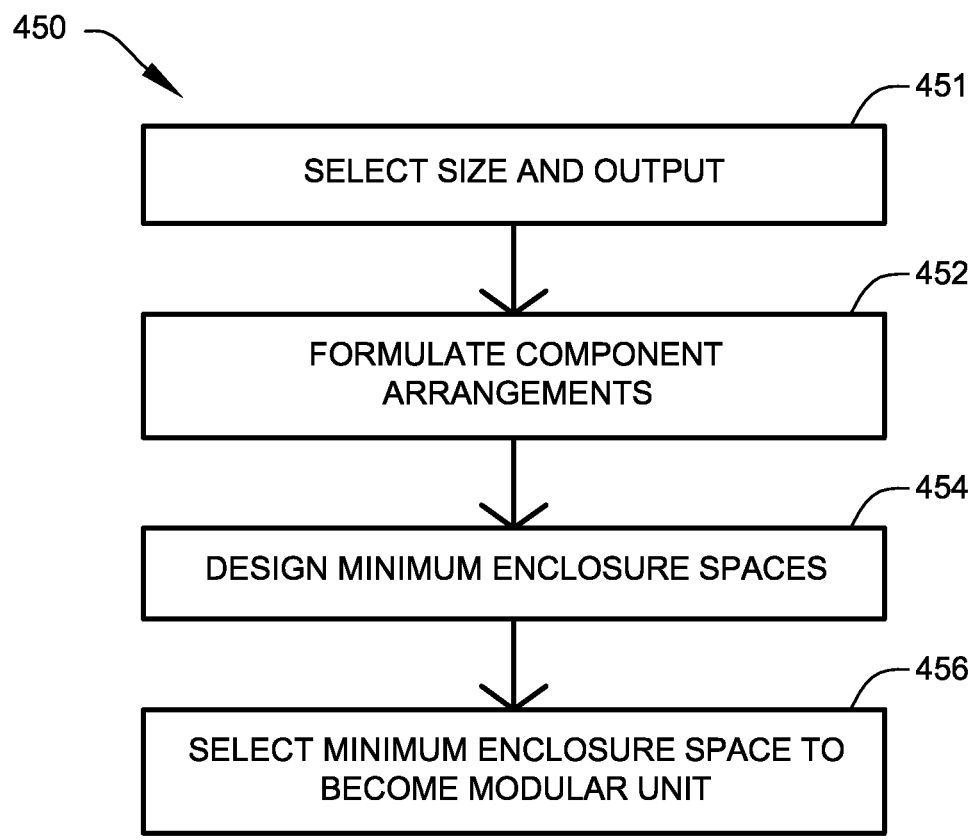
FIG. 14B is a flow diagram generally illustrating the preferred steps of an alternate preferred method of the present invention.

FIG. 14B is a flow diagram generally illustrating the preferred steps of method 450 of the present invention. Method 450 is preferably related to providing standard modular power units capable of producing electrical power. Both skid-mounted mobile generator set 302 and mobile generator set 102 are preferred "modular" embodiments of portable energy generation system 100. Preferred "modular" embodiments of portable energy generation system 100 are preferably designed with standardized units, dimensions, and weights, to enable easy assembly and repair, and to facilitate efficient system transport and placement.

In the initial preferred step 451 of method 450, an approximate size and power output for at least one modular generator engine unit to service large-power consumers is determined. In the present method, the large-power consumer is assumed to require a For example, both skid-mounted mobile generator set 302 and mobile generator set 102, required peak electrical output of about one megawatt with an enclosed housing having an internal volume 128 of less than about 24 cubic meters.

In the next preferred step 452, a set of component arrangements is formulated, preferably comprising efficient concatenations of the prime-mover, the electrical generator, and at least one control component of the modular generator engine unit. The control component of step 452 preferably comprises a control apparatus similar to control system 120. Next, as indicated in preferred step 454, a set of minimum enclosure spaces is designed into which the above-noted power components, electrical-generation components, and control components are together packageable. From this set of minimum spaces, one minimum enclosure space is selected to become the standard housing of the final modular power unit, as indicated in preferred step 456. From the selected design of step 456, many standard modular power units are subsequently manufactured and offered to the large-power consumers in exchange for an agreed-to compensation.

Figure 14C:
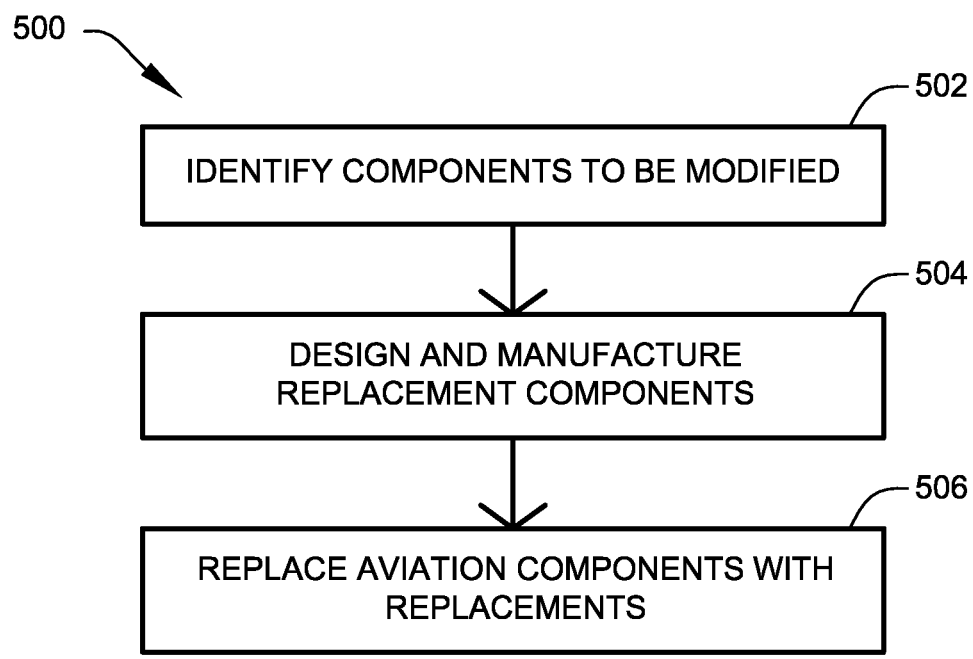
FIG. 14C is a flow diagram generally illustrating the preferred steps of another preferred method of the present invention.

FIG. 14C is a flow diagram generally illustrating the preferred steps of preferred method 500 of the present invention. Method 500 of portable energy generation system 100 comprises a means for altering of an existing aviation engine for aircraft for use in land power generation. As previously noted, radial power-generation unit 150 was preferably derived from the Curtiss-Wright R-1820 aviation engine. The basic R-1820 design was demonstrated to be extremely reliable when operated in conjunction with frequent service intervals. Such service demands are often at odds with the preferred service schedule of commercial engine-generator sets. To extend the time between service and time between overhauls of radial power-generation unit 150, key engine components are preferably replaced with heavier units designed for industrial service and increased performance. Within method 500, increased in-service durability is emphasized over the inherent balance between durability and component weight strictly dictated within aircraft design. The preferred modifications to radial power-generation unit 150 preferably include improvements to master rod assembly 153, enlargement and strengthening of the two-part crankcase assembly 186, the replacement of the multi-piece cylinder barrels with rugged one-piece units, among others.

Method 500 of portable energy generation system 100 provides a systematic means for increasing the time between overhauls (TBO) of an aviation-derived engine during use in non-aviation service. In the initial preferred step 502 of method 500, at least one first set of aviation engine components are identifying within the aviation-derived engine, to be modified to extend the time between overhauls (TBO). This may preferably include analysis of wear patterns, finite analysis of engine structures, computer-assisted modeling, and analysis of components, modifying components to comprise modern materials, utilizing new bearing designs, etc. In the next preferred step 504, at least one set of "industrialized" engine components are designed and manufactured to replace, substantially, the aviation engine components within the set of components identified for replacement. In preferred step 506, the engine components of the replacement set are replaced with their industrialized equivalents. In essentially all preferred embodiment of portable energy generation system 100, at least about fifty percent of the overall engine components are replaced.

FIG. 15 shows a side view of the mobile generator set containerized within a standard intermodal-transport shipping-container 550, according to an alternate preferred embodiment of the present invention.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A portable system relating to the generation of electric power comprising:
   a) at least one portable electric generator structured and arranged to generate such electrical power;
   b) wherein said at least one portable electric generator comprises
      i) at least one internal combustion engine structured and arranged to produce at least one output of rotary power, and an engine cradle for supporting said at least one internal combustion engine, said engine cradle coupled to said at least one internal combustion engine for support during operation and transportation;
      ii) at least one electrical generator structured and arranged to convert such at least one output of rotary power to at least one output of electrical energy,
      iii) at least one electrical controller structured and arranged to control such at least one output of electrical energy,
      iv) at least one towable wheeled trailer chassis structured and arranged to assist wheeled transport of said at least one internal combustion engine, said at least one electrical generator, and said at least one electrical controller and wherein said at least one towable wheeled trailer chassis includes a frame for supporting said engine cradle and said at least one internal combustion engine at a forward location and for supporting said at least one electrical generator at a location aft of said at least one internal combustion engine and wherein said portable electric power generation system has a towing weight of less than about 7200 kilograms such that said portable electric power generation system may be towed by a pickup truck having a one ton rating and may be driven by a non-commercial driver,
      v) an outer housing, having an enclosed volume, structured and arranged to house said at least one internal combustion engine, said at least one electrical generator, and said at least one electrical controller, and
      vi) at least one mount structured and arranged to mount said outer housing to said at least one wheeled chassis;
   c) wherein said at least one internal combustion engine comprises a plurality of combustion chambers organized in at least one radial geometry; and
   d) wherein each combustion chamber of said plurality of combustion chambers comprises at least one piston reciprocably disposed within at least one cylinder.

2. The portable system according to claim 1 wherein said at least one portable electric generator comprises: a) a system weight excluding operating fuel; and b) a peak electrical output to system weight ratio of about 0.17 kilowatts per kilogram.

3. The portable system according to claim 1 wherein said at least one portable electric generator comprises a peak electrical output of about one megawatt.

4. The system according to claim 3 wherein said at least one portable electric generator comprises a maximum system weight of less than about 7800 kilograms.

5. The portable system according to claim 3 wherein said at least one portable electric generator comprises a peak electrical output to enclosed housing volume ratio of about 41.5 kilowatts per cubic meter.

6. The portable system according to claim 3 wherein said outer housing comprises an enclosed volume of less than about 24 cubic meters.

7. The portable system according to claim 6 wherein said outer housing comprises a maximum outer length of less than about 4 meters.

8. The portable system according to claim 6 wherein said plurality of combustion chambers comprises at least nine pistons reciprocably disposed within at least nine cylinders.

9. The portable system according to claim 8 wherein each combustion chamber of said plurality of combustion chambers comprises a cylinder bore diameter of about 6.125 inches and a piston stroke of about 6.875 inches.

10. The portable system according to claim 8 wherein said at least one internal combustion engine comprises a displacement of greater than about 1,800 cubic inches.

11. The portable system according to claim 10 wherein said at least one internal combustion engine further comprises: a) at least one induction pathway structured and arranged to introduce a combustible air fuel mixture into said plurality of combustion chambers of said at least one internal combustion engine; b) wherein said at least one induction pathway comprises i) at least one air fuel mixer structured and arranged to produce such at least one combustible air fuel mixture, and ii) at least one compressor structured and arrange to pressurize such at least one combustible air fuel mixture prior to introduction into said plurality of combustion chambers.

12. The portable system according to claim 11 wherein said at least one compressor comprises at least one exhaust-driven turbocharger structured and arrange to be driven by exhaust gas exiting said at least one internal combustion engine.

13. The portable system according to claim 8 further comprising at least one oil-based piston cooler structured and arranged to cool each one of said at least nine pistons using at least one pressurized stream of lubricating oil.

14. The portable system according to claim 8 wherein each one of said at least nine cylinders comprises substantially at least one boron-iron alloy.

15. The portable system according to claim 8 wherein each one of said at least nine cylinders comprises substantially boron-alloy cast iron.

16. The portable system according to claim 8 wherein: a) each one of said plurality of combustion chambers comprises at least one cylinder-head assembly structured and arranged to provide valve-assisted control of combustion cycle gases of said at least one internal combustion engine; b) wherein said at least one cylinder-head assembly comprises substantially at least one Al—Si—Cu—Mg alloy.

17. A system relating to the generation of electric power comprising: a) at least one portable electric generator structured and arranged to generate such electrical power; b) wherein said at least one portable electric generator comprises i) at least one internal combustion engine structured and arranged to produce at least one output of rotary power and an engine cradle for supporting said at least one internal combustion engine, said engine cradle coupled to said at least one internal combustion engine for support during operation and transportation, ii) operationally coupled with said at least one internal combustion engine, at least one electrical generator structured and arranged to convert such at least one output of rotary power to at least one output of electrical energy, and iii) at least one electrical controller structured and arranged to control such at least one output of electrical energy, iv) an outer housing structured and arranged to house said at least one internal combustion engine, said at least one electrical generator, and said at least one electrical controller, and at least one towable wheeled trailer chassis structured and arranged to provide wheeled transport of said at least one internal combustion engine, said at least one electrical generator, and said at least one electrical controller and wherein said at least one towable wheeled trailer chassis includes a frame for supporting said engine cradle and said at least one internal combustion engine at a forward location and for supporting said at least one electrical generator at a location aft of said at least one internal combustion engine and wherein said portable electric power generation system has a towing weight of less than about 7200 kilograms such that said portable electric power generation system may be towed by a pickup truck having a one ton rating and may be driven by a non-commercial driver; c) wherein said at least one portable electric generator comprises a peak electrical output of about 1 megawatt; and d) wherein said outer housing comprises an enclosed volume of less than about 24 cubic meters.

18. The system according to claim 17 wherein said outer housing comprises a maximum outer dimension of less than about four meters.

19. The system according to claim 18 wherein said at least one portable electric generator comprises a weight less than about 5000 kilograms.

20. A portable electric generator system for the generation of electric power, comprising:
a) at least one electric generator structured and arranged to generate such electrical power, said at least one electric generator having a peak electrical output of about one megawatt;
b) at least one internal combustion, radial engine structured and arranged to produce at least one output of rotary power operationally coupled with said at least one electrical generator to convert such at least one output of rotary power to at least one output of electrical energy, wherein said at least one internal combustion, radial engine comprises nine combustion chambers and nine oil-cooled pistons structured and arranged to cool each one of said at least nine pistons using at least one pressurized stream of lubricating oil sprayed on the underside of the piston crown within a region of a piston skirt; and wherein said at least one internal combustion, radial engine further comprises a master rod having a first end coupled to a first piston and a second end for coupling to a crankshaft, wherein said master rod comprises a longitudinal oil passage formed along a central web of the master rod for communicating oil to said first piston;
c) at least one electrical controller structured and arranged to control such at least one output of electrical energy;
d) an outer housing, having an enclosed volume, structured and arranged to house said at least one internal combustion engine, said at least one electrical generator, and said at least one electrical controller; and
e) an engine cradle for supporting said at least one internal combustion engine, said engine cradle coupled to said at least one internal combustion engine for support during operation and transportation; and
f) at least one towable wheeled trailer chassis structured and arranged to provide wheeled transport of said at least one internal combustion engine, said at least one electrical generator, and said at least one electrical controller and wherein said at least one towable wheeled trailer chassis includes a frame for supporting said engine cradle and said at least one internal combustion engine at a forward location and for supporting said at least one electrical generator at a location aft of said at least one internal combustion engine and wherein said portable electric power generation system has a towing weight of less than about 7200 kilograms such that said portable electric power generation system may be towed by a pickup truck having a one ton rating and may be driven by a non-commercial driver.

21. The electric generator system according to claim 20 further comprising:
a chassis for supporting said at least one electric generator, and said at least one internal combustion, radial engine; and
a mount for coupling said outer housing to said chassis and wherein said outer housing and said chassis comprise an enclosed volume of less than 24 cubic meters.

22. The electric generator system according to claim 20 wherein said master rod includes a plurality of link-pin bores machined in said second end, said plurality of link-pin bores spaced evenly by angular position about a main bearing bore in said second end of said master rod.

23. The electric generator system according to claim 22 wherein at least one internal combustion, radial engine further comprises eight link rods, each link rod having a first end for coupling to a respective piston and a second end for coupling each link rod to a respective link-pin bore in said second end of said master rod; and wherein said master rod has a center of gravity located closer to said second end of said master rod to reduce the angular momentum and the friction of said piston in said cylinder.

24. The electric generator system according to claim 22 wherein each link rod of said eight link rods has a length of between fourteen and fifteen inches.

25. The electric generator system according to claim 24 wherein each link rod of said eight link rods has a length of approximately 14.763 inches and a tolerance of approximately +/−0.002 inches to increase the moment arm applied to said master rod by said link rods.

26. The electric generator system according to claim 22 wherein at least one internal combustion, radial engine further comprises a crankpin for coupling said main bearing bore in said second end of said master rod to the crankshaft and said crankpin comprises a set of lubrication holes for communication with a pressured lubrication system of said at least one internal combustion, radial engine and said longitudinal oil passage formed along said central web of said master rod for communicating oil to said first piston to dissipate heat from said first piston and to improve the durability level of said at least one internal combustion, radial engine.

27. The electric generator system according to claim 26 wherein each link rod of said at least one internal combustion, radial engine comprises an internal oil flow passage extending through a longitudinal axis of said link rod to deliver lubricating oil to a respective piston of said eight pistons.

28. The electric generator system according to claim 20 wherein each piston comprises at least one piston ring and at least one piston control ring.

29. The electric generator system according to claim 20 wherein each piston further comprises at least two piston rings and at least three piston control rings.

30. The electric generator system according to claim 20 wherein said at least one internal combustion, radial engine comprises nine cylinder barrels comprising a ferrous alloy, each said cylinder barrel including said combustion chamber located internally and a plurality of externally located structural cooling fins integrally cast about the outer circumference of said cylinder barrel to structurally reinforce said cylinder barrel while evenly distributing heat around said cylinder barrel to thereby maintain a consistent shape during extended operation.

31. The electric generator system according to claim 30 wherein each said cylinder barrel is shell-molded.

* * * * *